(12) United States Patent
Liang et al.

(10) Patent No.: US 10,554,567 B2
(45) Date of Patent: Feb. 4, 2020

(54) ROUTE PROCESSING METHOD, DEVICE, AND SYSTEM

(71) Applicant: Huawei Technologies Co., Ltd., Shenzhen (CN)

(72) Inventors: Qiandeng Liang, Nanjing (CN); Shunwan Zhuang, Beijing (CN); Jianjie You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 15/866,080

(22) Filed: Jan. 9, 2018

(65) Prior Publication Data

US 2018/0131622 A1 May 10, 2018

Related U.S. Application Data

(63) Continuation of application No. PCT/CN2016/087306, filed on Jun. 27, 2016.

(30) Foreign Application Priority Data

Oct. 16, 2015 (CN) .......................... 2015 1 0675200

(51) Int. Cl.
*H04L 12/841* (2013.01)
*H04L 12/751* (2013.01)

(52) U.S. Cl.
CPC .............. *H04L 47/28* (2013.01); *H04L 45/02* (2013.01)

(58) Field of Classification Search
CPC ......... H04L 47/28; H04L 45/38; H04L 45/02; H04L 63/1441; H04L 47/10; H04L 45/50;
(Continued)

(56) References Cited

U.S. PATENT DOCUMENTS

| 7,213,050 B1* | 5/2007 | Shaffer | ............... H04L 12/1813 370/261 |
| 2001/0036181 A1* | 11/2001 | Rogers | .................... H04L 45/40 370/389 |

(Continued)

FOREIGN PATENT DOCUMENTS

| CN | 101079779 A | 11/2007 |
| CN | 101436987 A | 5/2009 |

(Continued)

OTHER PUBLICATIONS

Rosen et al., MPLS Label Stack Encoding, MPLS Working Group, Jan. 2001, RFC 3032. (Year: 2001).*

(Continued)

*Primary Examiner* — Paul H Masur
*Assistant Examiner* — Michael K Phillips
(74) *Attorney, Agent, or Firm* — Conley Rose, P.C.

(57) ABSTRACT

A route processing method, a device, and a system, where the method includes obtaining, by a first network device, a flow effective time parameter and a route related to the flow effective time parameter, processing, by the first network device in the specified time interval, service traffic corresponding to the route related to the flow effective time parameter, generating a route control message, where the route control message carries the flow effective time parameter and the route, and sending, by the first network device, the route control message to a second network device. Therefore, limited-time effective information is automatically disseminated, a limited-time effective requirement for a traffic control policy is met, configuration workload is reduced, and maintenance difficulty is lowered.

28 Claims, 7 Drawing Sheets

(58) Field of Classification Search
CPC ......... H04L 47/24; H04L 47/72; H04L 47/70; H04L 47/801
See application file for complete search history.

(56) References Cited

U.S. PATENT DOCUMENTS

| | | | | |
|---|---|---|---|---|
| 2002/0042827 | A1* | 4/2002 | Grobler | H04L 29/06 709/227 |
| 2002/0165981 | A1* | 11/2002 | Basturk | G06F 9/542 709/242 |
| 2005/0058149 | A1* | 3/2005 | Howe | H04L 47/10 370/428 |
| 2006/0171323 | A1* | 8/2006 | Qian | H04L 45/10 370/252 |
| 2006/0203744 | A1* | 9/2006 | Patel | H04L 45/02 370/254 |
| 2007/0104106 | A1* | 5/2007 | Patel | H04L 45/02 370/238 |
| 2012/0182867 | A1* | 7/2012 | Farrag | H04W 28/0236 370/230 |
| 2013/0201909 | A1* | 8/2013 | Bosch | H04W 40/36 370/328 |
| 2015/0188731 | A1 | 7/2015 | Daly | |
| 2016/0029403 | A1* | 1/2016 | Roy | H04W 72/0406 370/336 |
| 2016/0323182 | A1* | 11/2016 | Segal | H04L 45/56 |
| 2019/0230015 | A1* | 7/2019 | Lad | G06F 11/079 |

FOREIGN PATENT DOCUMENTS

| CN | 101789904 A | | 7/2010 |
|---|---|---|---|
| CN | 103873379 A | * | 6/2014 |
| CN | 103873379 A | | 6/2014 |

OTHER PUBLICATIONS

Agarwal et al, "Time to Live (TTL) Processing in Multi-Protocol Label Switching (MPLS) Networks"; MPLS Working Group, Jan. 2003, RFC 3443. (Year: 2003).*
Machine Translation and Abstract of Chinese Publication No. CN101079779, Nov. 28, 2007, 33 pages.
Machine Translation and Abstract of Chinese Publication No. CN101436987, May 20, 2009, 19 pages.
Machine Translation and Abstract of Chinese Publication No. CN101789904, Jul. 28, 2010, 16 pages.
Machine Translation and Abstract of Chinese Publication No. CN103873379, Jun. 18, 2014, 26 pages.
Marques, P., et al., "Dissemination of Flow Specification Rules," RFC 5575, Aug. 2009, 22 pages.
Foreign Communication From a Counterpart Application, PCT Application No. PCT/CN2016/087306, English Translation of International Search Report dated Oct. 8, 2016, 2 pages.
"BGP Flowspec Overview," XP055484843, PTT Forum 8, Encantro Los Sistemas Autonomos da Internet no Brasil, Nov. 25, 2014, 24 pages.
Siddiqui, M.S., et al., "A survey on the recent efforts of the Internet Standardization Body for securing inter-domain routing," XP055484710, Computer Networks, vol. 80, Feb. 3, 2015, 26 pages.
Draves, R., et al., "Default Router Preferences and More—Specific Routes," RFC4191, Nov. 2005, XP015054878, 16 pages.
Foreign Communication From a Counterpart Application, European Application No. 16854763.6, Extended European Search Report dated Jun. 25, 2018, 11 pages.

* cited by examiner

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Flow effective time type (Flow Validity Period type) ||||||||||||||||| Length |||||||||||||||
| Start time type ||||||||||||||||| Duration type |||||||||||||||
| Start time value (s) ||||||||||||||||||||||||||||||||
| Start time value (μs) ||||||||||||||||||||||||||||||||
| Duration value (s) ||||||||||||||||||||||||||||||||
| Duration value (μs) ||||||||||||||||||||||||||||||||
| Delay value (s) ||||||||||||||||||||||||||||||||
| Delay value (μs) ||||||||||||||||||||||||||||||||
| Period value (s) ||||||||||||||||||||||||||||||||
| Period value (μs) ||||||||||||||||||||||||||||||||

FIG. 2

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Flow ID type | | | | | | | | | | | | | | | | Length | | | | | | | | | | | | | | | |
| AS ID | | | | | | | | | | | | | | | | | | | | | | | | | | | | | | | |
| Router ID | | | | | | | | | | | | | | | | | | | | | | | | | | | | | | | |
| Flow ID value | | | | | | | | | | | | | | | | | | | | | | | | | | | | | | | |

FIG. 3

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Flow description type | | | | | | | | | | | | | | | | Length | | | | | | | | | | | | | | | |
| Flow description value (variable length) | | | | | | | | | | | | | | | | | | | | | | | | | | | | | | | |

FIG. 4

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| Flow creation time type | | | | | | | | | | | | | | | | Length | | | | | | | | | | | | | | | |
| Flow creation time value (s) | | | | | | | | | | | | | | | | | | | | | | | | | | | | | | | |
| Flow creation time value (μs) | | | | | | | | | | | | | | | | | | | | | | | | | | | | | | | |

FIG. 5

ROUTE PROCESSING METHOD, DEVICE, AND SYSTEM

CROSS-REFERENCE TO RELATED APPLICATIONS

This application is a continuation of International Patent Application No. PCT/CN2016/087306 filed on Jun. 27, 2016, which claims priority to Chinese Patent Application No. 201510675200.1 filed on Oct. 16, 2015. The disclosures of the aforementioned applications are hereby incorporated by reference in their entireties.

TECHNICAL FIELD

This application relates to the field of communications technologies, and in particular, to a route processing method, a device, and a system.

BACKGROUND

Nowadays, network applications are developing toward refined management. For example, a user expects to control particular traffic in a specified time period. In an example, to ensure reliable bandwidth of video transmission in prime time at night, a network operator expects to limit data traffic of a common user who uses an Internet access service and does not limit data traffic in other time periods. To achieve this objective, a service traffic control policy that is effective in limited time needs to be deployed.

An effective time period of service traffic may be controlled by deploying an access control list (ACL) rule on a router. However, in a multi-router application scenario, an ACL rule needs to be deployed on each router. Configuration processes are complex and error-prone. Especially, all routers at a network edge need to take a joint action (such as in an anti-distributed denial of service (Anti-DDOS) attack scenario) in some service traffic control scenarios. This further increases configuration workload.

Furthermore, existing routing protocols do not support a limited-time effective feature. For example, the Border Gateway Protocol (BGP) is a dynamic routing protocol between autonomous systems (ASs), and supports dissemination of Internet Protocol (IP) routes, virtual private network (VPN) routes, and the BGP Flow Specification (Flow-Spec). The BGP does not support setting of an effective time period, and cannot implement a joint action (such as synchronously becoming effective, and becoming invalid during idle time) of multiple routers in a network. Therefore, the existing routing protocols cannot meet a limited-time effective requirement for the traffic control policy.

SUMMARY

In view of this, embodiments of this application provide a route processing method, a device, and a system in order to resolve problems that limited-time effective information of multiple network devices cannot be disseminated, and a limited-time effective requirement for a traffic control policy cannot be met in a service traffic control scenario with the multiple network devices.

Technical solutions provided by the embodiments of this application are as follows.

According to a first aspect, a route processing method is provided, and the method includes obtaining, by a first network device, a flow effective time parameter and a route related to the flow effective time parameter, where the flow effective time parameter includes a start time value and a duration value, and the flow effective time parameter is used to indicate that the route related to the flow effective time parameter is effective in a time interval specified by the flow effective time parameter, processing, by the first network device in the specified time interval, service traffic corresponding to the route related to the flow effective time parameter, and generating a route control message, where the route control message carries the flow effective time parameter and the route related to the flow effective time parameter, and sending, by the first network device, the route control message to a second network device.

Optionally, the first network device receives the flow effective time parameter and the route related to the flow effective time parameter from a management device.

Optionally, the flow effective time parameter further includes a start time type, where the start time type is immediate, delayed, or scheduled, and a start moment of the specified time interval is a moment at which the first network device starts processing the route control message when the start time type is immediate, the flow effective time parameter further includes a delay value, and a start moment of the specified time interval is the start time value plus the delay value when the start time type is delayed, or a start moment of the specified time interval is the start time value when the start time type is scheduled.

Optionally, the flow effective time parameter further includes a duration type, where the duration type is keeping effective, absolutely becoming invalid, or becoming invalid during idle time, and the duration value is an invalid value when the duration type is keeping effective, an end moment of the specified time interval is the start moment of the specified time interval plus the duration value when the duration type is absolutely becoming invalid, or an end moment of the specified time interval is a moment when time at which the first network device does not process the service traffic corresponding to the route related to the flow effective time parameter reaches the duration value and when the duration type is becoming invalid during idle time.

Optionally, the flow effective time parameter further includes a duration type and a period value, where the duration type is absolutely becoming invalid, the period value is used to indicate that the route related to the flow effective time parameter periodically becomes effective and is used to indicate a length of a period, and the period value is greater than or equal to the duration value, where a start moment of periodically becoming effective is the start time value or the moment at which the first network device starts processing the route control message, each period interval of periodically becoming effective includes the specified time interval, the start moment of the specified time interval is a start moment of each period interval of periodically becoming effective, and duration of the specified time interval is the duration value.

Based on the foregoing, a more comprehensive limited-time effective policy can be implemented by defining the start time type, the duration type, the delay value, and the period value for the flow effective time parameter. For example, limited-time effective policies such as delayed control, periodic control, or becoming invalid during idle time can be implemented to perform more complex joint control on multiple network devices.

Optionally, the route control message further includes at least one of the parameters such as a flow identifier (ID), flow description, flow creation time, or a flag of canceling an invalid route.

Optionally, the route control message is an extended BGP update message, where the extended BGP update message includes network layer reachability information (NLRI), the NLRI carries the route related to the flow effective time parameter, and the flow effective time parameter is used to indicate that the route related to the flow effective time parameter is effective in the specified time interval.

Optionally, the extended BGP update message includes a flow extension attribute, the flow extension attribute includes a flow effective time field, and the flow effective time field is used to carry the flow effective time parameter. The flow effective time field includes a flow effective time type field, a first length field, a start time value field, and a duration value field, where the flow effective time type field is used to indicate a type of the flow effective time field, the first length field is used to indicate a length of the flow effective time field, the start time value field is used to carry the start time value, and the duration value field is used to carry the duration value.

Optionally, the flow effective time field further includes a start time type field, a duration type field, and a delay value field, where the start time type field is used to indicate immediate, delayed, or scheduled, the duration type field is used to indicate keeping effective, absolutely becoming invalid, or becoming invalid during idle time, and the delay value field is used to carry the delay value.

Optionally, the flow effective time field further includes a period value field, where the period value field is used to carry the period value.

Optionally, the flow extension attribute further includes a flow ID field, and the flow ID field includes a flow ID type field, a second length field, an AS ID field, a router ID field, and a flow ID value field, where the flow ID type field is used to indicate a type of the flow ID field, the second length field is used to indicate a length of the flow ID field, the AS ID field is used to indicate an AS in which the first network device is located, the router ID field is used to identify the first network device, and the flow ID value field is used to carry the flow ID.

Optionally, the flow extension attribute further includes a flow description field, and the flow description field includes a flow description type field, a third length field, and a flow description value field, where the flow description type field is used to indicate a type of the flow description field, the third length field is used to indicate a length of the flow description field, and the flow description value field is used to carry the flow description.

Optionally, the flow extension attribute further includes a flow creation time field, and the flow creation time field includes a flow creation time type field, a fourth length field, and a flow creation time value field, where the flow creation time type field is used to indicate a type of the flow creation time field, the fourth length field is used to indicate a length of the flow creation time field, and the flow creation time value field is used to carry a flow creation time value.

Optionally, the flow extension attribute further includes a flag field of canceling an invalid route.

A route control message is generated based on the BGP such that a flow effective time parameter is carried in an extended BGP update message and is disseminated in multiple network devices. In addition, limited-time effective information can be automatically disseminated across AS domains based on the BGP.

According to a second aspect, a route processing method is provided, and the method includes receiving, by a second network device, a route control message from a first network device, where the route control message carries a flow effective time parameter and a route related to the flow effective time parameter, the flow effective time parameter includes a start time value and a duration value, and the flow effective time parameter is used to indicate that the route related to the flow effective time parameter is effective in a time interval specified by the flow effective time parameter, processing, by the second network device in the specified time interval, service traffic corresponding to the route related to the flow effective time parameter, and sending, by the second network device, the route control message to other network devices, where the other network devices do not include the first network device.

Optionally, the flow effective time parameter further includes a start time type, where the start time type is immediate, delayed, or scheduled, and a start moment of the specified time interval is a moment at which the second network device starts processing the route control message when the start time type is immediate, the flow effective time parameter further includes a delay value, and a start moment of the specified time interval is the start time value plus the delay value when the start time type is delayed, or a start moment of the specified time interval is the start time value when the start time type is scheduled.

Optionally, the flow effective time parameter further includes a duration type, where the duration type is keeping effective, absolutely becoming invalid, or becoming invalid during idle time, and the duration value is an invalid value when the duration type is keeping effective, an end moment of the specified time interval is the start moment of the specified time interval plus the duration value when the duration type is absolutely becoming invalid, or an end moment of the specified time interval is a moment when time at which the second network device does not process the service traffic corresponding to the route related to the flow effective time parameter reaches the duration value and when the duration type is becoming invalid during idle time.

Optionally, the flow effective time parameter further includes a duration type and a period value, where the duration type is absolutely becoming invalid, the period value is used to indicate that the route related to the flow effective time parameter periodically becomes effective and is used to indicate a length of a period, and the period value is greater than or equal to the duration value, where a start moment of periodically becoming effective is the start time value or the moment at which the second network device starts processing the route control message, each period interval of periodically becoming effective includes the specified time interval, the start moment of the specified time interval is a start moment of each period interval of periodically becoming effective, and duration of the specified time interval is the duration value.

Optionally, the second network device modifies the flow effective time parameter.

Optionally, the route control message further includes at least one of the parameters such as a flow ID, flow description, flow creation time, or a flag of canceling an invalid route.

Optionally, the route control message is an extended BGP update message, where the extended BGP update message includes NLRI, the NLRI carries the route related to the flow effective time parameter, and the flow effective time parameter is used to indicate that the route related to the flow effective time parameter is effective in the specified time interval.

Optionally, the extended BGP update message includes a flow extension attribute, the flow extension attribute includes a flow effective time field, and the flow effective time field is used to carry the flow effective time parameter, the flow effective time field includes a flow effective time type field, a first length field, a start time value field, and a duration value field, where the flow effective time type field is used to indicate a type of the flow effective time field, the first length field is used to indicate a length of the flow effective time field, the start time value field is used to carry the start time value, and the duration value field is used to carry the duration value.

Optionally, the flow effective time field further includes a start time type field, a duration type field, and a delay value field, where the start time type field is used to indicate immediate, delayed, or scheduled, the duration type field is used to indicate keeping effective, absolutely becoming invalid, or becoming invalid during idle time, and the delay value field is used to carry the delay value.

Optionally, the flow effective time field further includes a period value field, where the period value field is used to carry the period value.

Optionally, the flow extension attribute further includes a flow ID field, and the flow ID field includes a flow ID type field, a second length field, an AS ID field, a router ID field, and a flow ID value field, where the flow ID type field is used to indicate a type of the flow ID field, the second length field is used to indicate a length of the flow ID field, the AS ID field is used to indicate an AS in which the first network device is located, the router ID field is used to identify the first network device, and the flow ID value field is used to carry the flow ID.

Optionally, the flow extension attribute further includes a flow description field, and the flow description field includes a flow description type field, a third length field, and a flow description value field, where the flow description type field is used to indicate a type of the flow description field, the third length field is used to indicate a length of the flow description field, and the flow description value field is used to carry the flow description.

Optionally, the flow extension attribute further includes a flow creation time field, and the flow creation time field includes a flow creation time type field, a fourth length field, and a flow creation time value field, where the flow creation time type field is used to indicate a type of the flow creation time field, the fourth length field is used to indicate a length of the flow creation time field, and the flow creation time value field is used to carry a flow creation time value.

Optionally, the flow extension attribute further includes a flag field of canceling an invalid route.

According to a third aspect, a first network device is provided, including an obtaining unit configured to obtain a flow effective time parameter and a route related to the flow effective time parameter, where the flow effective time parameter includes a start time value and a duration value, and the flow effective time parameter is used to indicate that the route related to the flow effective time parameter is effective in a time interval specified by the flow effective time parameter, a processing unit configured to process, in the specified time interval, service traffic corresponding to the route related to the flow effective time parameter, and generate a route control message, where the route control message carries the flow effective time parameter and the route related to the flow effective time parameter, and a sending unit configured to send the route control message to a second network device.

Optionally, the obtaining unit is further configured to receive the flow effective time parameter and the route related to the flow effective time parameter from a management device.

Optionally, the flow effective time parameter further includes a start time type, where the start time type is immediate, delayed, or scheduled, and a start moment of the specified time interval is a moment at which the processing unit starts processing the route control message when the start time type is immediate, the flow effective time parameter further includes a delay value, and a start moment of the specified time interval is the start time value plus the delay value when the start time type is delayed, or a start moment of the specified time interval is the start time value when the start time type is scheduled.

Optionally, the flow effective time parameter further includes a duration type, where the duration type is keeping effective, absolutely becoming invalid, or becoming invalid during idle time, and the duration value is an invalid value when the duration type is keeping effective, an end moment of the specified time interval is the start moment of the specified time interval plus the duration value when the duration type is absolutely becoming invalid, or an end moment of the specified time interval is a moment when time at which the processing unit does not process the service traffic corresponding to the route related to the flow effective time parameter reaches the duration value and when the duration type is becoming invalid during idle time.

Optionally, the flow effective time parameter further includes a duration type and a period value, where the duration type is absolutely becoming invalid, the period value is used to indicate that the route related to the flow effective time parameter periodically becomes effective and is used to indicate a length of a period, and the period value is greater than or equal to the duration value, where a start moment of periodically becoming effective is the start time value or the moment at which the processing unit starts processing the route control message, each period interval of periodically becoming effective includes the specified time interval, the start moment of the specified time interval is a start moment of each period interval of periodically becoming effective, and duration of the specified time interval is the duration value.

Optionally, the route control message further includes at least one of the parameters such as a flow ID, flow description, flow creation time, or a flag of canceling an invalid route.

Optionally, the route control message is an extended BGP update message, where the extended BGP update message includes NLRI, the NLRI carries the route related to the flow effective time parameter, and the flow effective time parameter is used to indicate that the route related to the flow effective time parameter is effective in the specified time interval.

Optionally, the extended BGP update message includes a flow extension attribute, the flow extension attribute includes a flow effective time field, and the flow effective time field is used to carry the flow effective time parameter, the flow effective time field includes a flow effective time type field, a first length field, a start time value field, and a duration value field, where the flow effective time type field is used to indicate a type of the flow effective time field, the first length field is used to indicate a length of the flow effective time field, the start time value field is used to carry the start time value, and the duration value field is used to carry the duration value.

Optionally, the flow effective time field further includes a start time type field, a duration type field, and a delay value field, where the start time type field is used to indicate immediate, delayed, or scheduled, the duration type field is used to indicate keeping effective, absolutely becoming invalid, or becoming invalid during idle time, and the delay value field is used to carry the delay value.

Optionally, the flow effective time field further includes a period value field, where the period value field is used to carry the period value.

Optionally, the flow extension attribute further includes a flow ID field, and the flow ID field includes a flow ID type field, a second length field, an AS ID field, a router ID field, and a flow ID value field, where the flow ID type field is used to indicate a type of the flow ID field, the second length field is used to indicate a length of the flow ID field, the AS ID field is used to indicate an AS in which the first network device is located, the router ID field is used to identify the first network device, and the flow ID value field is used to carry the flow ID.

Optionally, the flow extension attribute further includes a flow description field, and the flow description field includes a flow description type field, a third length field, and a flow description value field, where the flow description type field is used to indicate a type of the flow description field, the third length field is used to indicate a length of the flow description field, and the flow description value field is used to carry the flow description.

Optionally, the flow extension attribute further includes a flow creation time field, and the flow creation time field includes a flow creation time type field, a fourth length field, and a flow creation time value field, where the flow creation time type field is used to indicate a type of the flow creation time field, the fourth length field is used to indicate a length of the flow creation time field, and the flow creation time value field is used to carry a flow creation time value.

Optionally, the flow extension attribute further includes a flag field of canceling an invalid route.

According to a fourth aspect, a second network device is provided, including a receiving unit configured to receive a route control message from a first network device, where the route control message carries a flow effective time parameter and a route related to the flow effective time parameter, the flow effective time parameter includes a start time value and a duration value, and the flow effective time parameter is used to indicate that the route related to the flow effective time parameter is effective in a time interval specified by the flow effective time parameter, a processing unit configured to process, in the specified time interval, service traffic corresponding to the route related to the flow effective time parameter, and a sending unit configured to send the route control message to other network devices, where the other network devices do not include the first network device.

Optionally, the flow effective time parameter further includes a start time type, where the start time type is immediate, delayed, or scheduled, and a start moment of the specified time interval is a moment at which the processing unit starts processing the route control message when the start time type is immediate, the flow effective time parameter further includes a delay value, and a start moment of the specified time interval is the start time value plus the delay value when the start time type is delayed, or a start moment of the specified time interval is the start time value when the start time type is scheduled.

Optionally, the flow effective time parameter further includes a duration type, where the duration type is keeping effective, absolutely becoming invalid, or becoming invalid during idle time, and the duration value is an invalid value when the duration type is keeping effective, an end moment of the specified time interval is the start moment of the specified time interval plus the duration value when the duration type is absolutely becoming invalid, or an end moment of the specified time interval is a moment when time at which the processing unit does not process the service traffic corresponding to the route related to the flow effective time parameter reaches the duration value and when the duration type is becoming invalid during idle time.

Optionally, the flow effective time parameter further includes a duration type and a period value, where the duration type is absolutely becoming invalid, the period value is used to indicate that the route related to the flow effective time parameter periodically becomes effective and is used to indicate a length of a period, and the period value is greater than or equal to the duration value, where a start moment of periodically becoming effective is the start time value or the moment at which the processing unit starts processing the route control message, each period interval of periodically becoming effective includes the specified time interval, the start moment of the specified time interval is a start moment of each period interval of periodically becoming effective, and duration of the specified time interval is the duration value.

Optionally, the second network device further includes a modification unit configured to modify the flow effective time parameter.

Optionally, the route control message further includes at least one of the parameters such as a flow ID, flow description, flow creation time, or a flag of canceling an invalid route.

Optionally, the route control message is an extended BGP update message, where the extended BGP update message includes NLRI, the NLRI carries the route related to the flow effective time parameter, and the flow effective time parameter is used to indicate that the route related to the flow effective time parameter is effective in the specified time interval.

Optionally, the extended BGP update message includes a flow extension attribute, the flow extension attribute includes a flow effective time field, and the flow effective time field is used to carry the flow effective time parameter, the flow effective time field includes a flow effective time type field, a first length field, a start time value field, and a duration value field, where the flow effective time type field is used to indicate a type of the flow effective time field, the first length field is used to indicate a length of the flow effective time field, the start time value field is used to carry the start time value, and the duration value field is used to carry the duration value.

Optionally, the flow effective time field further includes a start time type field, a duration type field, and a delay value field, where the start time type field is used to indicate immediate, delayed, or scheduled, the duration type field is used to indicate keeping effective, absolutely becoming invalid, or becoming invalid during idle time, and the delay value field is used to carry the delay value.

Optionally, the flow effective time field further includes a period value field, where the period value field is used to carry the period value.

Optionally, the flow extension attribute further includes a flow ID field, and the flow ID field includes a flow ID type field, a second length field, an AS ID field, a router ID field, and a flow ID value field, where the flow ID type field is used to indicate a type of the flow ID field, the second length field is used to indicate a length of the flow ID field, the AS ID field is used to indicate an AS in which the first network device is located, the router ID field is used to identify the first network device, and the flow ID value field is used to carry the flow ID.

Optionally, the flow extension attribute further includes a flow description field, and the flow description field includes a flow description type field, a third length field, and a flow description value field, where the flow description type field is used to indicate a type of the flow description field, the third length field is used to indicate a length of the flow description field, and the flow description value field is used to carry the flow description.

Optionally, the flow extension attribute further includes a flow creation time field, and the flow creation time field includes a flow creation time type field, a fourth length field, and a flow creation time value field, where the flow creation time type field is used to indicate a type of the flow creation time field, the fourth length field is used to indicate a length of the flow creation time field, and the flow creation time value field is used to carry a flow creation time value.

Optionally, the flow extension attribute further includes a flag field of canceling an invalid route.

According to a fifth aspect, a network system is provided, where the network system includes a first network device and a second network device, where the first network device is the first network device according to the third aspect, and the second network device is second network device according to the fourth aspect.

By means of implementations in this application, a first network device obtains a flow effective time parameter and a route related to the flow effective time parameter. The flow effective time parameter includes a start time value and a duration value. The flow effective time parameter is used to indicate that the route is effective in a time interval specified by the flow effective time parameter. The first network device sends the flow effective time parameter and the route to other network devices using a route control message. Therefore, limited-time effective information is automatically disseminated, a limited-time effective requirement for a traffic control policy is met, configuration workload is reduced, and maintenance difficulty is lowered.

BRIEF DESCRIPTION OF DRAWINGS

FIG. 2 is a schematic diagram of a format of a flow effective time field according to an embodiment of this application;

FIG. 3 is a schematic diagram of a format of a flow ID field according to an embodiment of this application;

FIG. 4 is a schematic diagram of a format of a flow description field according to an embodiment of this application;

FIG. 5 is a schematic diagram of a format of a flow creation time field according to an embodiment of this application;

DESCRIPTION OF EMBODIMENTS

The embodiments of this application provide a route processing method, a device, and a system in order to resolve problems that limited-time effective information of multiple network devices cannot be disseminated, and a limited-time effective requirement for a traffic control policy cannot be met in a service traffic control scenario with the multiple network devices.

The following provides detailed descriptions separately using specific embodiments.

To make the application objectives, features, and advantages of this application clearer and more comprehensible, the following clearly describes the technical solutions in the embodiments of this application with reference to the accompanying drawings in the embodiments of this application. The embodiments described in the following are merely a part rather than all of the embodiments of this application. All other embodiments obtained by a person of ordinary skill in the art based on the embodiments of this application without creative efforts shall fall within the protection scope of this application.

In the specification, claims, and accompanying drawings of this application, the terms "first," "second," "third," "fourth" and so on are intended to distinguish between different objects but do not indicate a particular order. In addition, the terms "include" and "have" are not exclusive. For example, a process, a method, a system, a product, or a device including a series of steps or units is not limited to the listed steps or units, and may further include steps or units that are not listed.

It should be understood that technical solutions in the embodiments of this application may be applied to various routing protocol scenarios, for example, scenarios of BGP-based dissemination of information about IP routes, VPN routes, and the BGP FlowSpec, routing scenarios based on the Intermediate System-to-Intermediate System (IS-IS), routing scenarios based on Open Shortest Path First (OSPF).

Figure 1:
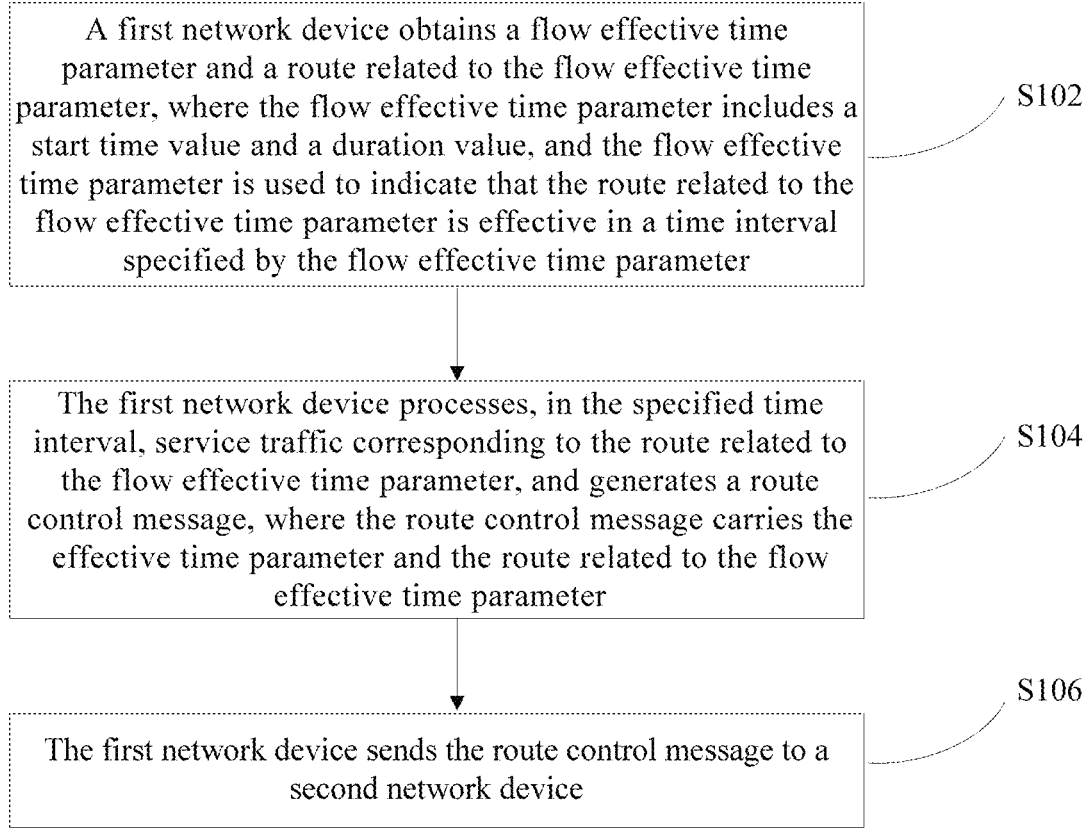
FIG. 1 is a flowchart of a route processing method executed by a first network device according to an embodiment of this application.

FIG. 1 is a flowchart of a route processing method executed by a first network device. As shown in FIG. 1, the first network device may be located in a first AS. Further, the first network device may be a border router (BR) and a network forwarding device such as a router or a switch having layer-3 functions may function as the BR. For example, in a network architecture scenario based on separated control and forwarding, a management device manages the first AS, and the management device uses a control channel protocol to control the first network device. The management device may be a network management device, an application program device, or the like. The route processing method executed by the first network device includes the following steps.

Step S102: The first network device obtains a flow effective time parameter and a route related to the flow effective time parameter, where the flow effective time parameter includes a start time value and a duration value, and the flow effective time parameter is used to indicate that the route related to the flow effective time parameter is effective in a time interval specified by the flow effective time parameter.

Step S104: The first network device processes, in the specified time interval, service traffic corresponding to the route related to the flow effective time parameter, and generates a route control message, where the route control message carries the flow effective time parameter and the route related to the flow effective time parameter.

Step S106: The first network device sends the route control message to a second network device.

In this embodiment, the flow effective time (also referred to as Flow valid time) parameter refers to a valid time interval of the route related to the flow effective time parameter. The route corresponds to the service traffic when the route is applied to a forwarding plane. Therefore, the flow effective time parameter may also be considered as a valid time interval of the flow related to the flow effective time parameter. The flow effective time parameter and the route related to the flow effective time parameter may be configured on the first network device or on the management device. Optionally, a specific implementation of configuring the flow effective time parameter and the route related to the flow effective time parameter on the first network device may include manually configuring the flow effective time parameter and a route that needs to become effective in limited time on the first network device, or manually configuring the flow effective time parameter and a rule filter on the first network device and filtering and finding a route that meets a filter rule according to the rule filter on the first network device. The route may be a routing entry. The filter rule may be an AS path, a community, a prefix, or the like. The route that needs to become effective in limited time is determined according to the filter rule. In addition, in the network architecture scenario based on separated control and forwarding, the foregoing configuration process may be completed on the management device. Then, the management device sends the flow effective time parameter and the route related to the flow effective time parameter to the first network device based on the control channel protocol using an interface. The control channel protocol may be the network configuration protocol (Netconf), the Simple Network Management Protocol (SNMP), the Simple Object Access Protocol (SOAP), or the Representational State Transfer (RESTful) Application Programming Interface (API) over Hypertext Transfer Protocol (HTTP). The flow effective time parameter includes a start time value and a duration value. The start time value is used to indicate a start moment at which the route related to the flow effective time parameter becomes effective. The start time value is usually represented as a difference between the start moment and 0:0 on Jan. 1, 1970, and may be accurate to microseconds (μs) or milliseconds (ms). 0 indicates an invalid value. The duration value is used to indicate duration in which the route related to the flow effective time parameter is effective. The duration may be accurate to μs or ms. 0 indicates an invalid value. Therefore, the flow effective time parameter is used to indicate that the route related to the flow effective time parameter is effective in the time interval specified by the flow effective time parameter. A start moment of the specified time interval is the start time value, and an end moment of the specified time interval is the start time value plus the duration value. For example, a start time value is 18:00 on Jan. 1, 2015, a duration value is 120 minutes, and a route invalid time is 20:00 on Jan. 1, 2015.

In this embodiment, the first network device generates the route control message. The route control message carries the flow effective time parameter and the route related to the flow effective time parameter. Optionally, the route control message may be represented in multiple specific forms. For example, the route control message is generated based on the BGP and may be an extended BGP update message. The extended BGP update message may be based on an IP route, a VPN route, or the BGP FlowSpec. For another example, the route control message is generated based on the IS-IS and may be an extended IS-IS link state packet (LSP). For another example, the route control message is generated based on the OSPF and may be an extended OSPF link state (LS) update packet.

In this embodiment, the first network device processes, according to the flow effective time parameter, the service traffic corresponding to the route related to the flow effective time parameter. When processing the route, the first network device checks the flow effective time parameter corresponding to the route. If the flow effective time parameter exists, the first network device controls, according to the flow effective time parameter, a time at which the route becomes effective, and processes the service traffic corresponding to the route. If the flow effective time parameter does not exist, the first network device processes the route as a common route. For example, the first network device runs the BGP and preferentially selects a route according to a route selection rule. If the selected route has a corresponding flow effective time parameter, the first network device controls, according to the flow effective time parameter, a time at which the route becomes effective, and processes service traffic corresponding to the route. The route selection rule includes, for example, ignoring a route if a next hop of the route is unreachable, selecting a route whose local preference is higher, selecting a route that is originated/aggregated by a local router, selecting a route whose AS path is shorter, sequentially selecting a route whose start point type is an Interior Gateway Protocol (IGP) type, or an Exterior Gateway Protocol (EGP) type, selecting a route whose multi-exit descriminator (MED) is smaller, preferentially selecting a route that is learned from the External BGP (EBGP), preferentially selecting a route whose IGP metric is lowest in an AS, selecting a route whose router ID is smaller, or the like. The foregoing rules may be used individually or in combination.

In this embodiment, the first network device sends the route control message to the second network device. The first network device may use the route control message to disseminate the effective time parameter and the route related to the flow effective time parameter to the second network device. After receiving the route control message, the second network device may process, according to the flow effective time parameter, the service traffic corresponding to the route related to the flow effective time parameter.

Optionally, the sequence for processing, in the specified time interval, the service traffic corresponding to the route related to the flow effective time parameter in step S104, generating the route control message in step S104, and sending the route control message to the second network device in step S106 is not limited. For example, processing, in the specified time interval, the service traffic corresponding to the route related to the flow effective time parameter may be performed before, after, or at the same time of generating the route control message and sending the route control message to the second network device.

Existing routing protocols do not support a limited-time effective feature and cannot meet a limited-time effective requirement for a traffic control policy. An ACL can only be locally deployed on a single router, and cannot be applied to a multi-router joint action scenario.

In the route processing method provided in this embodiment, a first network device generates a route control message, where the route control message carries a flow effective time parameter and a route related to the flow effective time parameter, and sends the route control message to a second network device. Therefore, the flow effective time parameter is automatically disseminated among multiple network devices, a limited-time effective requirement for a traffic control policy is met, configuration workload is reduced, and maintenance difficulty is lowered.

Optionally, obtaining, by a first network device, a flow effective time parameter and a route related to the flow effective time parameter includes receiving, by the first network device, the flow effective time parameter and the route related to the flow effective time parameter from the management device.

According to the foregoing description in this embodiment, the flow effective time parameter may be locally configured on the first network device. For the network architecture scenario based on separated control and forwarding, the flow effective time parameter may be configured on the management device and sent by the management device to the first network device. A process of configuring the flow effective time parameter may be statically configured by a network administrator or automatically configured according to a preset rule.

Optionally, the flow effective time parameter further includes a start time type. The start time type is immediate (also referred to as Immediate validation), delayed (also referred to as Delayed validation), or scheduled (also referred to as Timing validation). When the start time type is immediate, a start moment of the specified time interval is a moment at which the first network device starts processing the route control message. When the start time type is delayed, the flow effective time parameter further includes a delay value, and a start moment of the specified time interval is the start time value plus a delay value. When the start time type is scheduled, a start moment of the specified time interval is the start time value.

For example, when the start time type is immediate, the first network device by default considers the start time value as invalid regardless of whether the start time value is any numerical value. The first network device uses the moment at which the first network device starts processing the route control message as the start moment. The moment at which the first network device starts processing the route control message is a moment at which the network device parses and preferentially selects, after receiving the route control message, the route that is related to the flow effective time parameter and carried in the route control message, and installs the route in a forwarding information base (FIB) of the forwarding plane. Immediately becoming effective is equivalent to that a network device without time parameter control obtains a route and the route directly becomes effective in other approaches. A conventional BGP update message is used as an example. The BGP update message is deployed and transferred. A network device that receives the BGP update message directly processes the BGP update message. Therefore, setting the start time type to immediate may achieve a same effect as that in the other approaches. Optionally, the end moment of the specified time interval is the moment at which the first network device starts processing the route control message plus the duration value.

When the start time type is delayed, a start moment of the specified time interval is the start time value plus the delay value. Correspondingly, the end moment of the specified time interval is adding the delay value to a sum of the start time value and the duration value. For example, a start time value is 18:00 on Jan. 1, 2015, a duration value is 120 minutes, and an end moment (a time at which a route is invalid) is 20:00 on Jan. 1, 2015. If a start time type is delayed and a delay value is 30 minutes, an actual start time value is 18:30 on Jan. 1, 2015, and an actual end moment (a time at which a route is invalid) is 20:30 on Jan. 1, 2015.

When the start time type is scheduled, optionally, an end moment of the specified time interval is the start time value plus the duration value.

The start time type is not limited herein. Another start time type may be defined according to an actual management requirement.

Optionally, the flow effective time parameter further includes a duration type. The duration type is keeping effective (also referred to as permanent validation), absolutely becoming invalid (also referred to as hard invalidation), or becoming invalid during idle time (also referred to as idle invalidation). When the duration type is keeping effective, the duration value is an invalid value. When the duration type is absolutely becoming invalid, an end moment of the specified time interval is the start moment of the specified time interval plus the duration value. When the duration type is becoming invalid during idle time, an end moment of the specified time interval is a moment when time at which the first network device does not process the service traffic corresponding to the route related to the flow effective time parameter reaches the duration value.

For example, when the duration type is keeping effective, the first network device by default considers the duration value as invalid regardless of whether the duration value is any numerical value. A corresponding route keeps effective until a route control message indicating route cancellation is received. Therefore, keeping effective may be equivalent to that a network device without time parameter control obtains a route and the route directly becomes effective and keeps effective in the other approaches. A conventional BGP update message is used as an example. The BGP update message is deployed and transferred. A network device that receives the BGP update message directly processes the BGP update message. Further, the network device always keeps a route carried in the BGP update message effective without receiving a further instruction. Therefore, setting the duration type to keeping effective may be compatible with an implementation in which the route control message is directly deployed to keep the route effective. Correspondingly, a start time of the specified time interval is the start time value.

When the duration type is absolutely becoming invalid, the end moment of the specified time interval is the start moment of the specified time interval plus the duration value. Optionally, when the start time type is not limited or is scheduled, the start moment of the specified time interval is the start time value, and the end moment of the specified time interval is the start time value plus the duration value. When the start time type is delayed, the start moment of the specified time interval is the start time value plus the delay value, and the end moment of the specified time interval is adding the delay value to the sum of the start time value and the duration value. When the start time type is immediate, the start moment of the specified time interval is the moment at which the first network device starts processing the route control message, and the end moment of the specified time interval is the moment at which the first network device starts processing the route control message plus the duration value. For example, a start time value is 18:00 on Jan. 1, 2015, a duration value is 120 minutes, a duration type is absolutely becoming invalid, and a time at which a route is invalid is 20:00 on Jan. 1, 2015.

When the duration type is becoming invalid during idle time, optionally, when the start time type is not limited or is scheduled, the start moment of the specified time interval is the start time value, and when the start time type is immediate, the start moment of the specified time interval is the moment at which the first network device starts processing the route control message. When the duration type is becoming invalid during idle time, and the first network device does not process the service traffic corresponding to the route related to the flow effective time parameter in duration indicated by the duration value (it may be understood as duration in which the service traffic needing to be processed and corresponding to the route is not generated after the route becomes effective), the route related to the flow effective time parameter becomes invalid. Therefore, becoming invalid during idle time refers to that when the route keeps effective and time in which the route is idle reaches the duration value, the route is triggered to be invalid. For example, a start time value is 18:00 on Jan. 1, 2015, a duration value is 30 minutes, and a duration type is becoming invalid during idle time. After a route becomes effective, if time in which the route is idle (that is, duration in which service traffic needing to be processed and corresponding to the route is not generated) does not reach 30 minutes, counting is restarted. If time in which the route is idle (that is, duration in which service traffic needing to be processed and corresponding to the route is not generated) reaches 30 minutes, the route is triggered to be invalid. If duration in which the route is not applied to the corresponding service traffic still does not reach 30 minutes, the route keeps effective, and becomes invalid until the duration in which the route is not applied to the corresponding service traffic reaches 30 minutes.

Optionally, the flow effective time parameter further includes a duration type and a period value. The duration type is absolutely becoming invalid. The period value is used to indicate that the route related to the flow effective time parameter periodically becomes effective and is used to indicate a length of a period. The period value is greater than or equal to the duration value. A start moment of periodically becoming effective is the start time value or the moment at which the first network device starts processing the route control message. Each period interval of periodically becoming effective includes the specified time interval. The start moment of the specified time interval is a start moment of each period interval of periodically becoming effective. Duration of the specified time interval is the duration value.

For example, when the period value is valid, the route related to the flow effective time parameter repeatedly becomes effective in a period interval being the period value. As described above, a start moment of a first period interval is the start time value or the moment at which the first network device starts processing the route control message, and duration of the first period interval is the period value. Starting from the second period interval, a start moment of each period interval is an end moment of a previous period interval and duration is the period value. Each period interval includes one specified time interval. The route related to the flow effective time parameter repeatedly becomes effective in a period interval being the period value, until a route control message indicating route cancellation is received. In addition, when the period value is less than the duration value, the period value is invalid.

For example, when the duration type is absolutely becoming invalid, the period value is valid. For example, a start time value is 18:00 on Jan. 1, 2015, a duration value is 30 minutes, and a period value is 120 minutes. A route becomes effective at 18:00 on Jan. 1, 2015, and becomes invalid at 18:30 on Jan. 1, 2015. Because the period value is valid (a start moment of the period value is 18:00 on Jan. 1, 2015), the route becomes effective again at 20:00 on Jan. 1, 2015. The duration value is 30 minutes. That is, the route becomes effective at 20:00 on Jan. 1, 2015, and becomes invalid at 20:30 on Jan. 1, 2015. Then, the route becomes effective again at 22:00 on Jan. 1, 2015. The foregoing process repeats.

Optionally, if the period value is less than the duration value, the first network device may use a notification message, for example, a BGP notification, to notify a parameter sender that the defined period value is incorrect.

Based on the foregoing, a more comprehensive limited-time effective policy can be implemented by defining the start time type, the duration type, the delay value, and the period value for the flow effective time parameter. For example, limited-time effective policies such as delayed control, periodic control, or becoming invalid during idle time can be implemented to perform more complex joint control on multiple network devices.

Optionally, the first network device modifies the flow effective time parameter.

Further, the first network device may modify any parameter in the flow effective time parameter, for example, modify the start time value, or change the start time type.

Optionally, the route control message further includes at least one of the parameters such as a flow ID, flow description, flow creation time, or a flag of canceling an invalid route.

For example, a flow ID is used to uniquely identify a flow, and may be applied to a partial control scenario (such as fault diagnosis and log) to simplify the process of identifying a flow. Specific content and a configuration rule of a flow do not need to be indicated, and the flow ID is used to simplify an identifying process. The flow ID may further include an AS ID, a router ID, and a flow ID value. The AS ID is an ID of an AS in which an originating network device is located. In this embodiment, the AS ID is an ID of an AS in which the first network device is located. The router ID is an ID of the originating network device. In this embodiment, the router ID is an ID of the first network device. AS ID+router ID+flow ID value may uniquely identify a flow.

Flow description is used to describe a route control message, for example, describe a limited-time function or usage of the route control message.

Flow creation time is a creation time of the route control message in the originating network device. In this embodiment, the originating network device is the first network device. The flow creation time may be used for diagnosis or log tracking.

The network device usually does not proactively cancel a currently invalid route, but only identifies the route as invalid. In any case, the network device may receive a route control message indicating route cancellation and passively cancel the invalid route. The flag of canceling an invalid route is used to indicate whether to proactively cancel an already invalid route. When the flag of canceling an invalid route is set, the network device proactively cancels the currently invalid route.

As described above, the route control message may be generated based on the BGP, IS-IS, or OSPF. The following separately describes the three application scenarios.

Application Scenario 1: The Route Control Message May be Generated Based on the BGP.

Optionally, the route control message is an extended BGP update message. The extended BGP update message includes NLRI. The NLRI carries the route related to the flow effective time parameter. The flow effective time parameter is used to indicate that the route related to the flow effective time parameter is effective in the specified time interval.

As described above, the route control message may be generated based the BGP and may be an extended BGP update message. The extended BGP update message may be based on an IP route, a VPN route, or the BGP FlowSpec. The extended BGP update message carries the flow effective time parameter and the route related to the flow effective time parameter. Further, the route related to the flow effective time parameter is encapsulated into NLRI of the extended BGP update message. The flow effective time parameter is used to indicate that the route related to the flow effective time parameter is effective in the specified time interval.

Optionally, the extended BGP update message includes a flow extension attribute, the flow extension attribute includes a flow effective time field, and the flow effective time field is used to carry the flow effective time parameter. The flow effective time field includes a flow effective time type field, a first length field, a start time value field, and a duration value field. The flow effective time type field is used to indicate a type of the flow effective time field, the first length field is used to indicate a length of the flow effective time field, the start time value field is used to carry the start time value, and the duration value field is used to carry the duration value.

For example, currently the BGP defines 16 attribute types, including AS path, community, and extended community. The BGP is extended in this application and a new attribute type is defined, that is, the flow extension attribute. The flow extension attribute exists together with the existing 16 attribute types. The extended BGP update message includes the flow extension attribute. The flow extension attribute includes the flow effective time field, as shown in FIG. 2. FIG. 2 is a schematic diagram of a format of the flow effective time field. The flow effective time field may be defined using a type-length-value (TLV) format. The flow effective time field is used to carry the flow effective time parameter. The flow effective time field includes the flow effective time type field, a length field, the start time value field, and the duration value field. The flow effective time type field is used to indicate a type of the flow effective time field, the length field is used to indicate a length of the flow effective time field, the start time value field is used to carry the start time value, and the duration value field is used to carry the duration value. Both the start time value field and the duration value field include two fields: second (s) and μs. A final numerical value of the start time value field or the duration value field is a sum of numerical values in the two fields, s and μs. For example, a numerical value of the start time value field is a start time value (s)+a start time value (μs). The flow effective time type field and the length field each occupy two bytes, and the start time value field and the duration value field each occupy eight bytes (i.e., 4 bytes from s and 4 bytes from μs fields). This is not limited herein.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

For example, as shown in FIG. 2, the flow effective time field further includes the start time type field, the duration type field, and the delay value field. The start time type field and the duration type field each occupy two bytes, and the delay value field occupies eight bytes. This is not limited herein. The delay value field includes two fields s and μs. A final numerical value of the delay value field is a sum of numerical values in the two fields, s and μs.

The start time type field is used to indicate immediate, delayed, or scheduled. As shown in Table 1, the first column of the Table 1 indicates a type, and the second column describes functions. 0, 1, and 2 in the first column of the Table 1 are merely examples, and may be defined by a standard organization. Table 1 defines three common types. Other types may be defined. This is not limited herein.

TABLE 1

Definitions of the start time type

| Type | Function Description |
| --- | --- |
| 0 | Immediate (immediate validation) |
| 1 | Delayed (delayed validation) |
| 2 | Scheduled (timing validation) |
| ... | ... |

The duration type field is used to indicate keeping effective, absolutely becoming invalid, or becoming invalid during idle time. As shown in Table 2, the first column of the Table 2 indicates a type, and the second column describes functions. 0, 1, and 2 in the first column of the Table 2 are merely examples, and may be defined by a standard organization. Table 2 defines three common types. Other types may be defined. This is not limited herein.

TABLE 2

Definitions of the duration type

| Type | Function Description |
| --- | --- |
| 0 | Keeping effective (permanent validation) |
| 1 | Absolutely becoming invalid (hard invalidation) |
| 2 | Becoming invalid during idle time (idle invalidation) |
| ... | ... |

Optionally, the flow effective time field further includes a period value field. The period value field is used to carry the period value.

For example, as shown in FIG. 2, the flow effective time field further includes a period value field. The period value field occupies eight bytes, and this is not limited herein. The period value field includes two fields: s and μs. A final numerical value of the period value field is a sum of numerical values in the two fields, s and μs.

The flow effective time field and functions and usage of the fields included by the flow effective time field are described in the foregoing part of this embodiment. Details are not provided again herein.

Optionally, the flow extension attribute further includes a flow ID field. The flow ID field includes a flow ID type field, a second length field, an AS ID field, a router ID field, and a flow ID value field. The flow ID type field is used to indicate a type of the flow ID field. The second length field is used to indicate a length of the flow ID field. The AS ID field is used to indicate an AS in which the first network device is located. The router ID field is used to identify the first network device. The flow ID value field is used to carry the flow ID.

For example, as shown in FIG. 3, the flow ID field may be defined using a TLV format. The flow ID field includes the flow ID type field, the length field, the AS ID field, the router ID field, and the flow ID value field. The flow ID type field and the length field each occupy two bytes. The AS ID field, the router ID field, and the flow ID value field each occupy four bytes. This is not limited herein. In an implementation of the BGP, the flow ID field is used to uniquely identify a FlowSpec rule or an IP prefix.

Optionally, the flow extension attribute further includes a flow description field. The flow description field includes a flow description type field, a third length field, and a flow description value field. The flow description type field is used to indicate a type of the flow description field. The third length field is used to indicate a length of the flow description field. The flow description value field is used to carry the flow description.

For example, as shown in FIG. 4, the flow extension attribute includes the flow description field. The flow description field may be defined using a TLV format. The flow description field includes the flow description type field, the length field, and the flow description value field. The flow description type field and the length field each occupy two bytes. The flow description value field is of a variable length and does not exceed 256 bytes. This is not limited herein.

Optionally, the flow extension attribute further includes a flow creation time field. The flow creation time field includes a flow creation time type field, a fourth length field, and a flow creation time value field. The flow creation time type field is used to indicate a type of the flow creation time field. The fourth length field is used to indicate a length of the flow creation time field. The flow creation time value field is used to carry a flow creation time value.

For example, as shown in FIG. 5, the flow extension attribute further includes the flow creation time field. The flow creation time field may be defined using a TLV format. The flow creation time field includes the flow creation time type field, the length field, and the flow creation time value field. The flow creation time type field and the length field each occupy two bytes, and the flow creation time value field occupies eight bytes. This is not limited herein. The flow creation time value field includes two fields: s and µs. A final numerical value of the flow creation time value field is a sum of numerical values in the two fields, s and µs.

Optionally, the flow extension attribute further includes a flag field of canceling an invalid route.

For example, the flag field of canceling an invalid route may be defined as a standalone field, or may be carried in an existing field, for example, carried in the flow effective time field.

Functions and usage of the flow ID field, the flow description field, the flow creation time field, and the flag field of canceling an invalid route are described in the foregoing part of this embodiment. Details are not provided again herein.

A route control message is generated based on the BGP such that a flow effective time parameter is carried in an extended BGP update message and is disseminated in multiple network devices. In addition, limited-time effective information can be automatically disseminated across AS domains based on the BGP.

Application Scenario 2: The Route Control Message May be Generated Based on the IS-IS.

Optionally, the route control message is an extended IS-IS LSP. The extended IS-IS LSP includes a FlowSpec reachability field, and the FlowSpec reachability field includes the flow effective time field. The flow effective time field is used to carry the flow effective time parameter. The flow effective time field includes the flow effective time type field, the length field, the start time value field, and the duration value field. The flow effective time type field is used to indicate a type of the flow effective time field, the length field is used to indicate a length of the flow effective time field, the start time value field is used to carry the start time value, and the duration value field is used to carry the duration value.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

Optionally, the flow effective time field further includes a period value field. The period value field is used to carry the period value.

For example, the extended IS-IS LSP includes the FlowSpec reachability field. The FlowSpec reachability field uses a TLV format. The flow effective time field in a sub-TLV format is carried in the FlowSpec reachability field. The format of the flow effective time field is similar to the format shown in FIG. 2, and the difference lies only in that the flow effective time type field and the length field each occupy one byte in the extended IS-IS LSP. Likewise, the FlowSpec reachability field may further carry the flow ID field, the flow description field, the flow creation time field, and the flag field of canceling an invalid route. Formats of the flow ID field, the flow description field, and the flow creation time field are similar to the formats shown in FIG. 3 and FIG. 5, and the difference lies only in that the type field and the length field each occupy one byte in the extended IS-IS LSP.

Application Scenario 3: The Route Control Message May be Generated Based on the OSPF.

Optionally, the route control message is an extended OSPF LS update packet. The extended OSPF LS update packet includes a FlowSpec opaque link state advertisement (LSA) field, and the FlowSpec opaque LSA field includes the flow effective time field. The flow effective time field is used to carry the flow effective time parameter. The flow effective time field includes the flow effective time type field, the length field, the start time value field, and the duration value field. The flow effective time type field is used to indicate a type of the flow effective time field, the length field is used to indicate a length of the flow effective time field, the start time value field is used to carry the start time value, and the duration value field is used to carry the duration value.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

Optionally, the flow effective time field further includes a period value field. The period value field is used to carry the period value.

For example, the extended OSPF LS update packet includes the FlowSpec opaque LSA field. The flow effective time field in a TLV format is carried in the FlowSpec opaque LSA field. The format of the flow effective time field is the same as the format shown in FIG. 2. Likewise, the FlowSpec opaque LSA field may further carry the flow ID field, the flow description field, the flow creation time field, and the flag field of canceling an invalid route. Formats of the flow ID field, the flow description field, and the flow creation time field are the same as the formats shown in FIG. 3 and FIG. 5.

In the technical solution provided in this embodiment, a first network device generates a route control message, where the route control message carries a flow effective time parameter and a route related to the flow effective time parameter, and sends the route control message to a second network device. Therefore, the flow effective time parameter is automatically disseminated among multiple network devices, a limited-time effective requirement for a traffic control policy is met, configuration workload is reduced, and maintenance difficulty is lowered.

Figure 6:
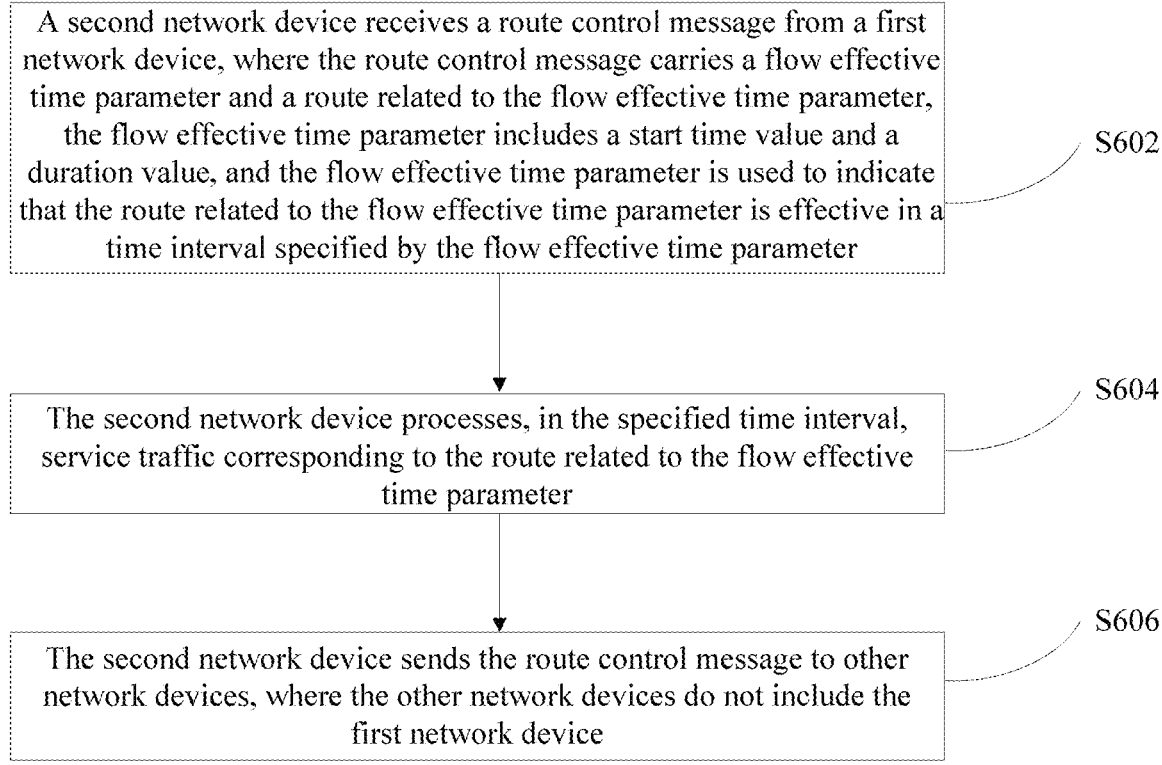
FIG. 6 is a flowchart of a route processing method executed by a second network device according to an embodiment of this application.

FIG. 6 is a flowchart of a route processing method executed by a second network device according to an embodiment of this application. The embodiment of this application describes the route processing method from a perspective of the second network device. As shown in FIG. 6, the second network device performs the following steps.

Step S602: The second network device receives a route control message from a first network device, where the route control message carries a flow effective time parameter and a route related to the flow effective time parameter, the flow effective time parameter includes a start time value and a duration value, and the flow effective time parameter is used to indicate that the route related to the flow effective time parameter is effective in a time interval specified by the flow effective time parameter.

Step S604: The second network device processes, in the specified time interval, service traffic corresponding to the route related to the flow effective time parameter.

Step S606: The second network device sends the route control message to other network devices, where the other network devices do not include the first network device.

Further, the route processing method executed by the second network device shown in FIG. 6 is similar to the route processing method executed by the first network device shown in FIG. 1 in the foregoing embodiment. The difference lies in that the second network device does not directly configure the flow effective time parameter and the route related to the flow effective time parameter, but receives the route control message from the first network device. The route control message carries the flow effective time parameter and the route related to the flow effective time parameter. As an equivalent part of the first network device, after receiving the route control message, the second network device processes, according to the flow effective time parameter, service traffic corresponding to the route related to the flow effective time parameter, and disseminates the route control message to other network devices.

Optionally, the flow effective time parameter further includes a start time type. The start time type is immediate, delayed, or scheduled. When the start time type is immediate, a start moment of the specified time interval is a moment at which the second network device starts processing the route control message. The moment at which the second network device starts processing the route control message is a moment at which the network device parses and preferentially selects, after receiving the route control message, the route that is related to the flow effective time parameter and carried in the route control message, and installs the route in an FIB of a forwarding plane. The flow effective time parameter further includes a delay value when the start time type is delayed. A start moment of the specified time interval is the start time value plus the delay value. When the start time type is scheduled, a start moment of the specified time interval is the start time value.

Optionally, the flow effective time parameter further includes a duration type. The duration type is keeping effective, absolutely becoming invalid, or becoming invalid during idle time. When the duration type is keeping effective, the duration value is an invalid value. When the duration type is absolutely becoming invalid, an end moment of the specified time interval is the start moment of the specified time interval plus the duration value. When the duration type is becoming invalid during idle time, an end moment of the specified time interval is a moment when time at which the second network device does not process the service traffic corresponding to the route related to the flow effective time parameter reaches the duration value.

Optionally, the flow effective time parameter further includes a duration type and a period value. The duration type is absolutely becoming invalid. The period value is used to indicate that the route related to the flow effective time parameter periodically becomes effective and is used to indicate a length of a period. The period value is greater than or equal to the duration value. A start moment of periodically becoming effective is the start time value or the moment at which the second network device starts processing the route control message. Each period interval of periodically becoming effective includes the specified time interval. The start moment of the specified time interval is a start moment of each period interval of periodically becoming effective. Duration of the specified time interval is the duration value.

Optionally, the second network device modifies the flow effective time parameter.

Optionally, the route control message further includes at least one of the parameters such as a flow ID, flow description, flow creation time, or a flag of canceling an invalid route.

Optionally, the route control message is an extended BGP update message. The extended BGP update message includes NLRI. The NLRI carries the route related to the flow effective time parameter. The flow effective time parameter is used to indicate that the route related to the flow effective time parameter is effective in the specified time interval.

Optionally, the extended BGP update message includes a flow extension attribute. The flow extension attribute includes a flow effective time field, and the flow effective time field is used to carry the flow effective time parameter. The flow effective time field includes a flow effective time type field, a first length field, a start time value field, and a duration value field. The flow effective time type field is used to indicate a type of the flow effective time field. The first length field is used to indicate a length of the flow effective time field. The start time value field is used to carry the start time value. The duration value field is used to carry the duration value.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

Optionally, the flow effective time field further includes a period value field. The period value field is used to carry the period value.

Optionally, the flow extension attribute further includes a flow ID field. The flow ID field includes a flow ID type field, a second length field, an AS ID field, a router ID field, and a flow ID value field. The flow ID type field is used to indicate a type of the flow ID field. The second length field is used to indicate a length of the flow ID field. The AS ID field is used to indicate an AS in which the first network device is located. The router ID field is used to identify the first network device. The flow ID value field is used to carry the flow ID.

Optionally, the flow extension attribute further includes a flow description field. The flow description field includes a flow description type field, a third length field, and a flow description value field. The flow description type field is used to indicate a type of the flow description field. The third length field is used to indicate a length of the flow description field. The flow description value field is used to carry the flow description.

Optionally, the flow extension attribute further includes a flow creation time field. The flow creation time field includes a flow creation time type field, a fourth length field, and a flow creation time value field. The flow creation time type field is used to indicate a type of the flow creation time field. The fourth length field is used to indicate a length of the flow creation time field. The flow creation time value field is used to carry a flow creation time value.

Optionally, the flow extension attribute further includes a flag field of canceling an invalid route.

For a specific process of executing the route processing method by the second network device, refer to description of the embodiment corresponding to FIG. 1 and FIG. 5. Details are not provided again herein. Similarly, the route control message may be generated based on the IS-IS or OSPF in the route processing method executed by the second network device. For a specific implementation, refer to the description of the foregoing embodiment.

In the technical solution provided in this embodiment, a second network device receives and processes a route control message, and sends the route control message to other network devices. Therefore, a flow effective time parameter is automatically disseminated among multiple network devices, a limited-time effective requirement for a traffic control policy is met, configuration workload is reduced, and maintenance difficulty is lowered.

Figure 7:
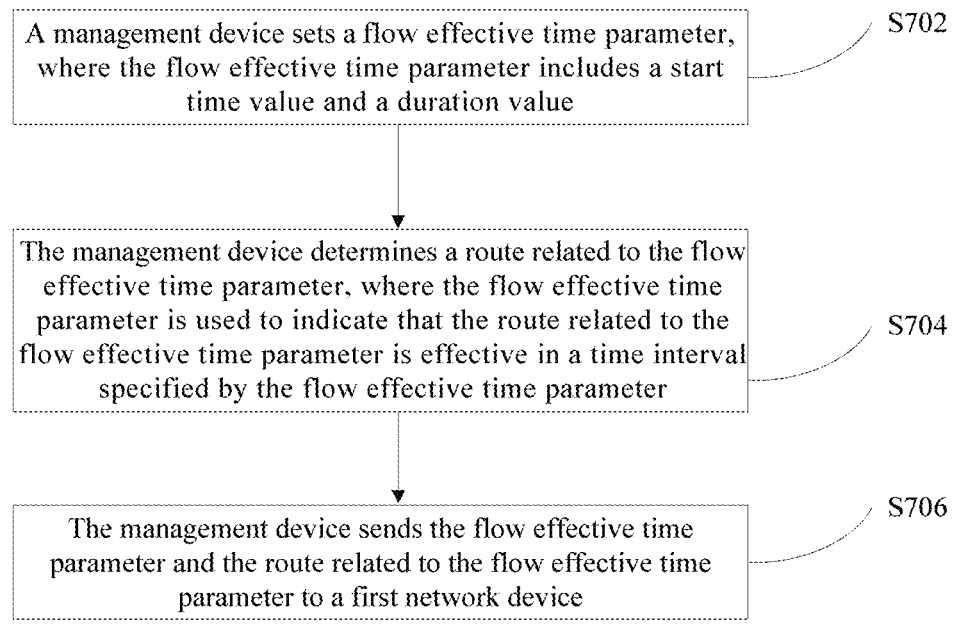
FIG. 7 is a flowchart of a route processing method executed by a management device according to an embodiment of this application.

FIG. 7 is a flowchart of a route processing method executed by a management device according to an embodiment of this application. The embodiment of this application describes the route processing method from a perspective of the management device. As shown in FIG. 7, the management device performs the following steps.

Step S702: The management device sets a flow effective time parameter, where the flow effective time parameter includes a start time value and a duration value.

Step S704: The management device determines a route related to the flow effective time parameter, where the flow effective time parameter is used to indicate that the route related to the flow effective time parameter is effective in a time interval specified by the flow effective time parameter.

Step S706. The management device sends the flow effective time parameter and the route related to the flow effective time parameter to a first network device.

Further, in a network architecture scenario based on separated control and forwarding, a routing information base (RIB) is stored on the management device and the flow effective time parameter is directly configured on the management device. Then, the management device establishes a mapping relationship between the flow effective time parameter and the RIB according to a preset rule. The management device determines the route related to the flow effective time parameter in the RIB according to the flow effective time parameter. The management device sends the flow effective time parameter and the route related to the flow effective time parameter to the first network device based on a control channel protocol using an interface. The control channel protocol may be Netconf, SNMP, SOAP, or RESTful API over HTTP.

In the technical solution provided in this embodiment, a management device configures a flow effective time parameter and a route related to the flow effective time parameter, and sends the flow effective time parameter and the route related to the flow effective time parameter to a first network device. Therefore, centralized configuration and automatic dissemination of flow effective time parameter information are implemented in a network architecture scenario based on separated control and forwarding.

Figure 8:
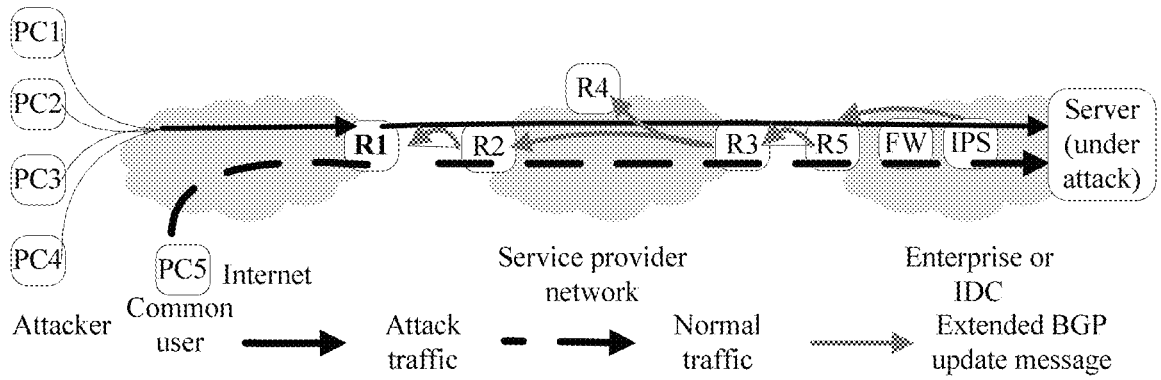
FIG. 8 is a schematic diagram of a structure of an application scenario according to an embodiment of this application.

FIG. 8 is a schematic diagram of a structure of an application scenario according to an embodiment of this application. FIG. 8 shows an application manner of using an extended BGP update message to carry a flow effective time parameter in an Anti-DDOS inter-domain FlowSpec injection scenario.

A network shown in FIG. 8 includes an Internet, a service provider network, and an enterprise or an Internet data center (IDC). A common user PC5 accesses a server in the enterprise or the IDC by means of a BR R1 of the Internet, BRs R2 and R3 in the service provider network, a BR R5 in the enterprise or the IDC, the firewall (FW), and an intrusion prevention system (IPS). Attackers PC1, PC2, PC3 and PC4 may initiate a multipoint attack from different locations. The attackers PC1 to PC4 perform a traffic attack to the server in the enterprise or the IDC by means of the R1, R2, R3, R5, FW, and IPS.

When the server in the enterprise or the IDC is under a DDOS attack, the IPS or the FW detects attack traffic and generates an attack traffic control policy. Because the attack traffic comes from multiple points PC1, PC2, PC3, and PC4, duration of each attack point may differ. When the attack traffic control policy is configured, a duration type in the flow effective time parameter may be set to becoming invalid during idle time. If becoming invalid during idle time is set to 30 minutes, it indicates that the attack stops if the attack traffic is not detected in the 30 minutes, and the attack traffic control policy becomes invalid. The IPS or the FW sends the flow effective time parameter (a start time type: immediate, the duration type: becoming invalid during idle time) and a route related to the flow effective time parameter to the R5. The R5 processes, according to the flow effective time parameter, attack traffic corresponding to the route related to the flow effective time parameter. In addition, the R5 generates an extended BGP update message. The extended BGP update message carries the flow effective time parameter and the route related to the flow effective time parameter. The R5 and the R3 establish an EBGP session and the R5 sends the extended BGP update message to the R3. After receiving the extended BGP update message, the R3 processes, according to the flow effective time parameter, the attack traffic corresponding to the route related to the flow effective time parameter, and disseminates the extended BGP update message to the R4 and the R2. The R2 uses the same operation manner to disseminate the extended BGP update message to the R1. In this way, with dissemination of the extended BGP update message, the attack traffic is sequentially controlled and blocked on the R5, R3, R4, R2, and R1. In the case of becoming invalid during idle time, that is, when the attack traffic is blocked or stopped, routes through the R5, R3, R4, R2, and R1 sequentially become invalid. Each BR may proactively cancel, based on a configured flag of canceling an invalid route, its own already invalid route, or may receive a message of canceling an invalid route from the IPS or the FW to passively cancel the already invalid route.

Figure 9:
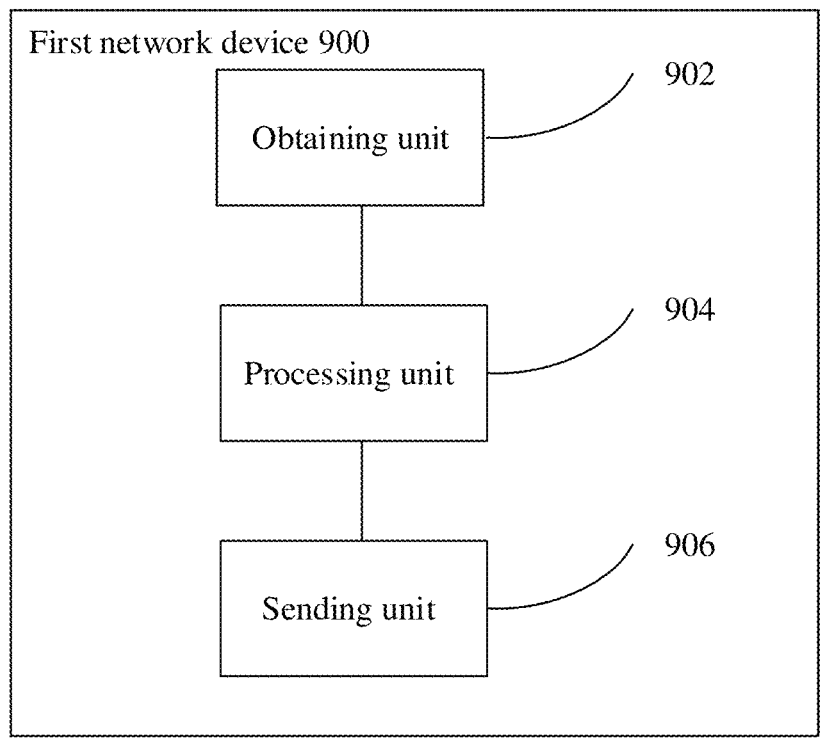
FIG. 9 is a schematic diagram of a structure of a first network device according to an embodiment of this application.

FIG. 9 is a schematic diagram of a structure of a first network device 900 according to an embodiment of the present application. The first network device 900 shown in FIG. 9 may perform corresponding steps performed by the first network device in the foregoing method embodiment. As shown in FIG. 9, the first network device 900 includes an obtaining unit 902, a processing unit 904, and a sending unit 906.

The obtaining unit 902 is configured to obtain a flow effective time parameter and a route related to the flow effective time parameter. The flow effective time parameter includes a start time value and a duration value. The flow effective time parameter is used to indicate that the route related to the flow effective time parameter is effective in a time interval specified by the flow effective time parameter.

The processing unit 904 is configured to process, in the specified time interval, service traffic corresponding to the route related to the flow effective time parameter, and generate a route control message. The route control message carries the flow effective time parameter and the route related to the flow effective time parameter.

The sending unit 906 is configured to send the route control message to a second network device.

Optionally, obtaining a flow effective time parameter and a route related to the flow effective time parameter includes receiving, by the obtaining unit 902, the flow effective time parameter and the route related to the flow effective time parameter from a management device.

Optionally, the flow effective time parameter further includes a start time type. The start time type is immediate, delayed, or scheduled. When the start time type is immediate, a start moment of the specified time interval is a moment at which the processing unit starts processing the route control message. When the start time type is delayed, the flow effective time parameter further includes a delay value, and a start moment of the specified time interval is the start time value plus the delay value. When the start time type is scheduled, a start moment of the specified time interval is the start time value.

Optionally, the flow effective time parameter further includes a duration type. The duration type is keeping effective, absolutely becoming invalid, or becoming invalid during idle time. When the duration type is keeping effective, the duration value is an invalid value. When the duration type is absolutely becoming invalid, an end moment of the specified time interval is the start moment of the specified time interval plus the duration value. When the duration type is becoming invalid during idle time, an end moment of the specified time interval is a moment when time at which the processing unit does not process the service traffic corresponding to the route related to the flow effective time parameter reaches the duration value.

Optionally, the flow effective time parameter further includes a duration type and a period value. The duration type is absolutely becoming invalid. The period value is used to indicate that the route related to the flow effective time parameter periodically becomes effective and is used to indicate a length of a period. The period value is greater than or equal to the duration value. A start moment of periodically becoming effective is the start time value or the moment at which the processing unit 904 starts processing the route control message. Each period interval of periodically becoming effective includes the specified time interval. The start moment of the specified time interval is a start moment of each period interval of periodically becoming effective. Duration of the specified time interval is the duration value.

Optionally, the route control message further includes at least one of the parameters such as a flow ID, flow description, flow creation time, or a flag of canceling an invalid route.

Optionally, the route control message is an extended BGP update message. The extended BGP update message includes NLRI. The NLRI carries the route related to the flow effective time parameter. The flow effective time parameter is used to indicate that the route related to the flow effective time parameter is effective in the specified time interval.

Optionally, the extended BGP update message includes a flow extension attribute. The flow extension attribute includes a flow effective time field, and the flow effective time field is used to carry the flow effective time parameter. The flow effective time field includes a flow effective time type field, a first length field, a start time value field, and a duration value field. The flow effective time type field is used to indicate a type of the flow effective time field. The first length field is used to indicate a length of the flow effective time field. The start time value field is used to carry the start time value. The duration value field is used to carry the duration value.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

Optionally, the flow effective time field further includes a period value field. The period value field is used to carry the period value.

Optionally, the flow extension attribute further includes a flow ID field. The flow ID field includes a flow ID type field, a second length field, an AS ID field, a router ID field, and a flow ID value field. The flow ID type field is used to indicate a type of the flow ID field. The second length field is used to indicate a length of the flow ID field. The AS ID field is used to indicate an AS in which the first network device is located. The router ID field is used to identify the first network device. The flow ID value field is used to carry the flow ID.

Optionally, the flow extension attribute further includes a flow description field. The flow description field includes a flow description type field, a third length field, and a flow description value field. The flow description type field is used to indicate a type of the flow description field. The third length field is used to indicate a length of the flow description field. The flow description value field is used to carry the flow description.

Optionally, the flow extension attribute further includes a flow creation time field. The flow creation time field includes a flow creation time type field, a fourth length field, and a flow creation time value field. The flow creation time type field is used to indicate a type of the flow creation time field. The fourth length field is used to indicate a length of the flow creation time field. The flow creation time value field is used to carry a flow creation time value.

Optionally, the flow extension attribute further includes a flag field of canceling an invalid route.

The first network device 900 shown in FIG. 9 may perform corresponding steps performed by the first network device in the foregoing method embodiment. Therefore, a flow effective time parameter is automatically disseminated among multiple network devices, a limited-time effective requirement for a traffic control policy is met, configuration workload is reduced, and maintenance difficulty is lowered.

Figure 10:
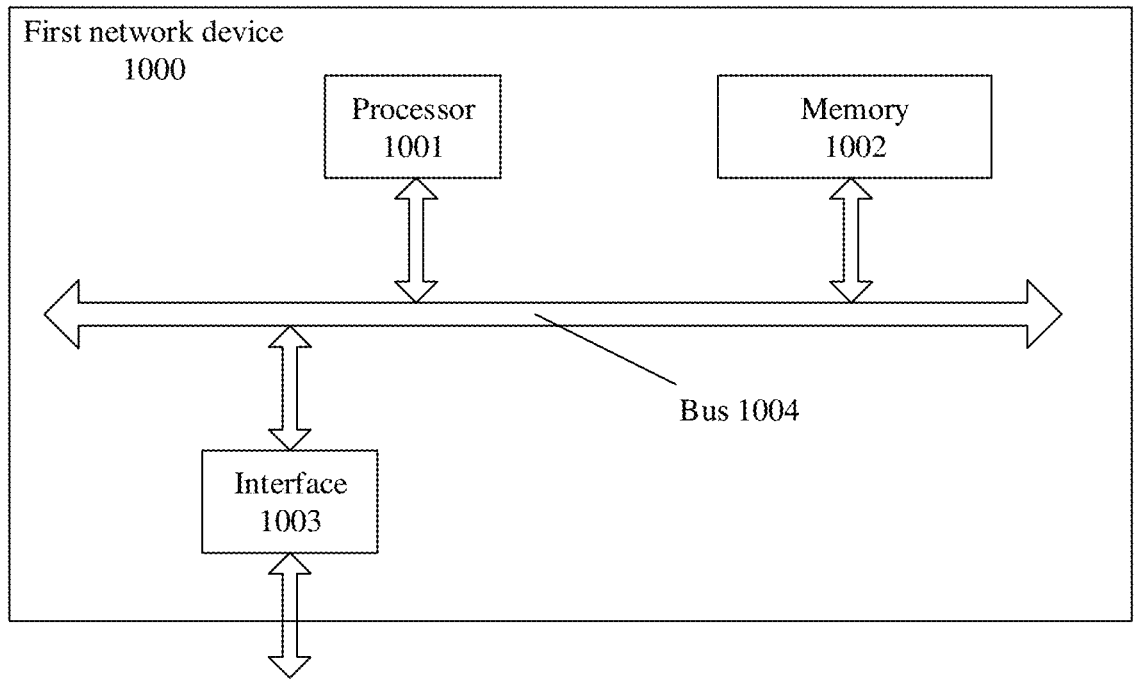
FIG. 10 is a schematic diagram of a hardware structure of a first network device according to an embodiment of this application.

FIG. 10 is a schematic diagram of a hardware structure of a first network device 1000 according to an embodiment of the present application. The first network device 1000 shown in FIG. 10 may perform corresponding steps performed by the first network device in the foregoing method embodiment. Optionally, the first network device 1000 may be a BR. The BR may be a network forwarding device such as a router or a switch having layer-3 functions.

As shown in FIG. 10, the first network device 1000 includes a processor 1001, a memory 1002, an interface 1003, and a bus 1004. The interface 1003 may be implemented in a wireless or wired manner, and may be a component, such as a network interface card. The processor 1001, the memory 1002 and the interface 1003 are connected using the bus 1004.

The interface 1003 may include a sender and a receiver, which are configured to support sending and receiving information between the first network device and the second network device and a controller in the foregoing embodiment. For example, the interface 1003 is configured to support steps S102 and S106 in the process shown in FIG. 1. The processor 1001 is configured to perform the processing process related to the first network device shown in FIG. 1 and/or another process related to the technology described in this application. For example, the processor 1001 is configured to support steps S102 and S104 in the process shown in FIG. 1. The memory 1002 is configured to store program code and data of the first network device 1000.

It may be understood that FIG. 10 shows only a simplified design of the first network device 1000. During actual application, the first network device 1000 may include any quantities of interfaces 1003, processors 1001, memories 1002, and the like. All first network devices that can implement the present application fall within the protection scope of the present application.

Figure 11:
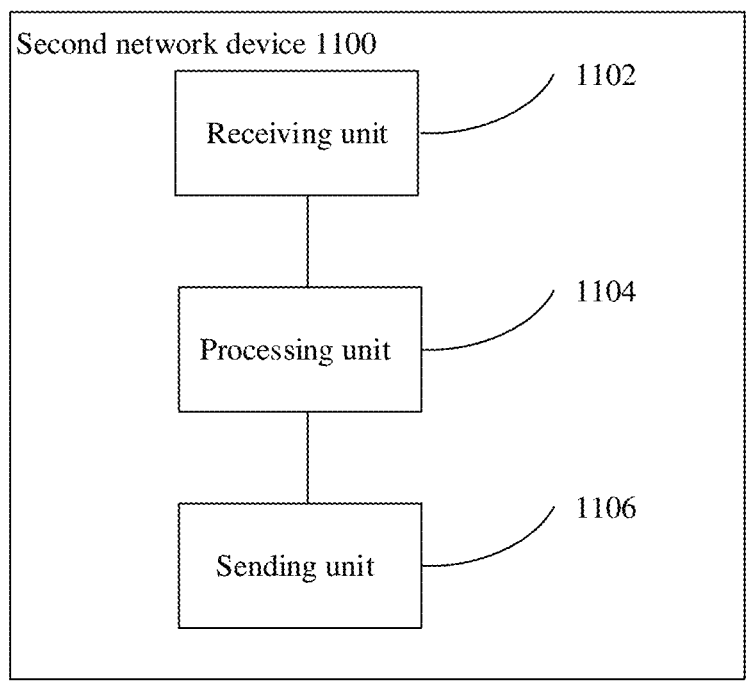
FIG. 11 is a schematic diagram of a structure of a second network device according to an embodiment of this application.

FIG. 11 is a schematic diagram of a structure of a second network device 1100 according to an embodiment of the present application. The second network device 1100 shown in FIG. 11 may perform corresponding steps performed by the second network device in the foregoing method embodiment. As shown in FIG. 11, the second network device 1100 includes a receiving unit 1102, a processing unit 1104, and a sending unit 1106.

The receiving unit 1102 is configured to receive a route control message from a first network device. The route control message carries a flow effective time parameter and a route related to the flow effective time parameter. The flow effective time parameter includes a start time value and a duration value. The flow effective time parameter is used to indicate that the route related to the flow effective time parameter is effective in a time interval specified by the flow effective time parameter.

The processing unit 1104 is configured to process, in the specified time interval, service traffic corresponding to the route related to the flow effective time parameter.

The sending unit 1106 is configured to send the route control message to other network devices. The other network devices do not include the first network device.

Optionally, the flow effective time parameter further includes a start time type. The start time type is immediate, delayed, or scheduled. When the start time type is immediate, a start moment of the specified time interval is a moment at which the processing unit starts processing the route control message. When the start time type is delayed, the flow effective time parameter further includes a delay value, and a start moment of the specified time interval is the start time value plus the delay value. When the start time type is scheduled, a start moment of the specified time interval is the start time value.

Optionally, the flow effective time parameter further includes a duration type. The duration type is keeping effective, absolutely becoming invalid, or becoming invalid during idle time. When the duration type is keeping effective, the duration value is an invalid value. When the duration type is absolutely becoming invalid, an end moment of the specified time interval is the start moment of the specified time interval plus the duration value. When the duration type is becoming invalid during idle time, an end moment of the specified time interval is a moment when time at which the processing unit 1104 does not process the service traffic corresponding to the route related to the flow effective time parameter reaches the duration value.

Optionally, the flow effective time parameter further includes a duration type and a period value. The duration type is absolutely becoming invalid. The period value is used to indicate that the route related to the flow effective time parameter periodically becomes effective and is used to indicate a length of a period. The period value is greater than or equal to the duration value. A start moment of periodically becoming effective is the start time value or the moment at which the processing unit 1104 starts processing the route control message. Each period interval of periodically becoming effective includes the specified time interval. The start moment of the specified time interval is a start moment of each period interval of periodically becoming effective. Duration of the specified time interval is the duration value.

Optionally, the second network device 1100 further includes a modification unit (not shown) configured to modify the flow effective time parameter.

Optionally, the route control message further includes at least one of the parameters such as a flow ID, flow description, flow creation time, or a flag of canceling an invalid route.

Optionally, the route control message is an extended BGP update message. The extended BGP update message includes NLRI. The NLRI carries the route related to the flow effective time parameter. The flow effective time parameter is used to indicate that the route related to the flow effective time parameter is effective in the specified time interval.

Optionally, the extended BGP update message includes a flow extension attribute. The flow extension attribute includes a flow effective time field, and the flow effective time field is used to carry the flow effective time parameter. The flow effective time field includes a flow effective time type field, a first length field, a start time value field, and a duration value field. The flow effective time type field is used to indicate a type of the flow effective time field. The first length field is used to indicate a length of the flow effective time field. The start time value field is used to carry the start time value. The duration value field is used to carry the duration value.

Optionally, the flow effective time field further includes a start time type field, a duration type field, and a delay value field. The start time type field is used to indicate immediate, delayed, or scheduled. The duration type field is used to indicate keeping effective, absolutely becoming invalid, or becoming invalid during idle time. The delay value field is used to carry the delay value.

Optionally, the flow effective time field further includes a period value field. The period value field is used to carry the period value.

Optionally, the flow extension attribute further includes a flow ID field. The flow ID field includes a flow ID type field, a second length field, an AS ID field, a router ID field, and a flow ID value field. The flow ID type field is used to indicate a type of the flow ID field. The second length field is used to indicate a length of the flow ID field. The AS ID field is used to indicate an AS in which the first network device is located. The router ID field is used to identify the first network device. The flow ID value field is used to carry the flow ID.

Optionally, the flow extension attribute further includes a flow description field. The flow description field includes a flow description type field, a third length field, and a flow description value field. The flow description type field is used to indicate a type of the flow description field. The third length field is used to indicate a length of the flow description field. The flow description value field is used to carry the flow description.

Optionally, the flow extension attribute further includes a flow creation time field. The flow creation time field includes a flow creation time type field, a fourth length field, and a flow creation time value field. The flow creation time type field is used to indicate a type of the flow creation time field. The fourth length field is used to indicate a length of the flow creation time field. The flow creation time value field is used to carry a flow creation time value.

Optionally, the flow extension attribute further includes a flag field of canceling an invalid route.

The second network device 1100 shown in FIG. 11 may perform corresponding steps performed by the second network device in the foregoing method embodiment. Therefore, a flow effective time parameter is automatically disseminated among multiple network devices, a limited-time effective requirement for a traffic control policy is met, configuration workload is reduced, and maintenance difficulty is lowered.

Figure 12:
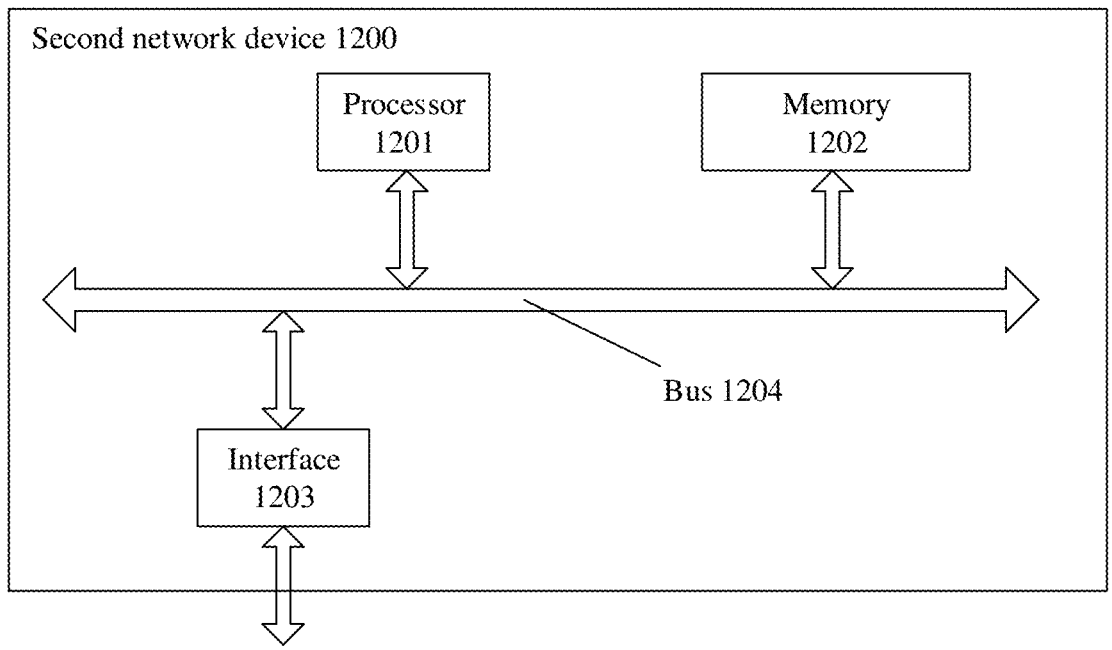
FIG. 12 is a schematic diagram of a hardware structure of a second network device according to an embodiment of this application.

FIG. 12 is a schematic diagram of a hardware structure of a second network device 1200 according to an embodiment of the present application. The second network device 1200 shown in FIG. 12 may perform corresponding steps performed by the second network device in the foregoing method embodiment. Optionally, the second network device 1200 may be a BR. The BR may be a network forwarding device such as a router or a switch having layer-3 functions.

As shown in FIG. 12, the second network device 1200 includes a processor 1201, a memory 1202, an interface 1203, and a bus 1204. The interface 1203 may be implemented in a wireless or wired manner, and may be a component, such as a network interface card. The processor 1201, the memory 1202 and the interface 1203 are connected using the bus 1204.

The interface 1203 may further include a sender and a receiver, which are configured to support sending and receiving information between the second network device and the first network device and another network device in the foregoing embodiment. For example, the interface 1203 is configured to support steps S602 and S606 in the process shown in FIG. 6. The processor 1201 is configured to perform the processing process related to the second network device shown in FIG. 6 and/or another process related to the technology described in this application. For example, the processor 1201 is configured to support step S604 in the process shown in FIG. 6. The memory 1202 is configured to store program code and data of the second network device 1200.

It may be understood that FIG. 12 shows only a simplified design of the second network device 1200. During actual application, the second network device 1200 may include any quantities of interfaces 1203, processors 1201, memories 1202, and the like. All second network devices that can implement the present application fall within the protection scope of the present application.

Figure 13:
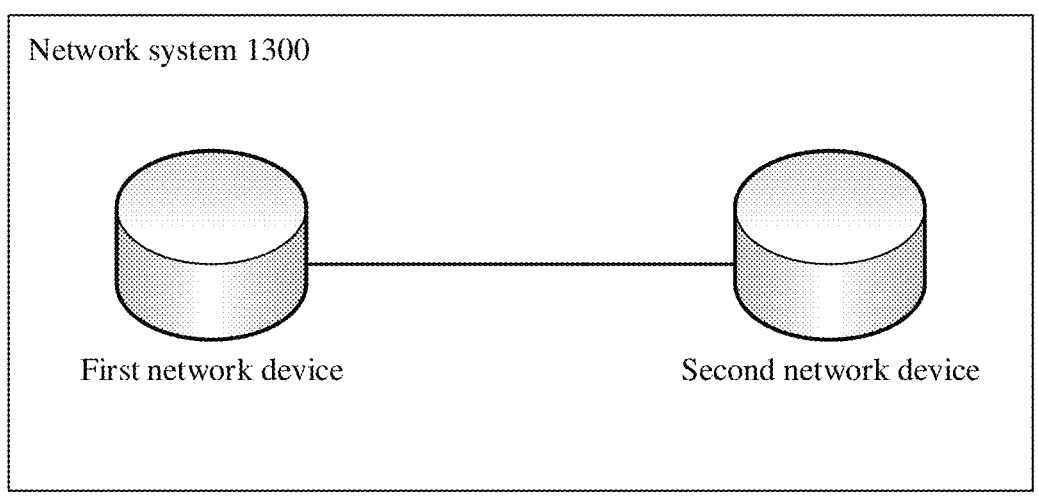
FIG. 13 is a schematic diagram of a structure of a network system according to an embodiment of this application.

In addition, as shown in FIG. 13, an embodiment of the present application further provides a network system 1300. The network system 1300 may include the first network device provided in the embodiment corresponding to FIG. 9 or FIG. 10 and the second network device provided in the embodiment corresponding to FIG. 11 or FIG. 12. The first network device and the second network device are not described in detail again herein.

Methods or algorithm steps described in combination with the content disclosed in the present application may be implemented by hardware, or may be implemented by a processor by executing a software instruction. The software instruction may include a corresponding software module, and the software module may be stored in a random access memory (RAM), a flash memory, a read-only memory (ROM), an erasable programmable ROM (EPROM), an electrically EPROM (EEPROM), a register, a hard disk, a removable hard disk, a compact disc ROM (CD-ROM), or a storage medium of any other form well known in the art. A storage medium used as an example is coupled to the processor such that the processor can read information from the storage medium, and can write information into the storage medium. Certainly, the storage medium may be a part of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present application are further described in detail in the foregoing specific embodiments. It should be understood that the foregoing descriptions are merely specific embodiments of the present application, but are not intended to limit the protection scope of the present application. Any modification, equivalent replacement, or improvement made based on the technical solutions of the present application shall fall within the protection scope of the present application.

What is claimed is:

1. A route processing method, comprising:
obtaining, by a first network device, a flow effective time parameter and a route related to the flow effective time parameter, wherein the flow effective time parameter comprises a start time value and a duration value, and wherein the flow effective time parameter indicates that the route related to the flow effective time parameter is effective in a time interval specified by the flow effective time parameter;
processing, by the first network device in the specified time interval, service traffic corresponding to the route related to the flow effective time parameter;
generating, by the first network device, a route control message carrying the flow effective time parameter and the route related to the flow effective time parameter; and
sending, by the first network device, the route control message to a second network device, wherein the route control message comprises an extended border gateway protocol (BGP) update message, wherein the extended BGP update message comprises network layer reachability information (NLRI), wherein the NLRI carries the route related to the flow effective time parameter, and wherein the flow effective time parameter indicates that the route related to the flow effective time parameter is effective in the specified time interval.

2. The method according to claim 1, wherein the flow effective time parameter further comprises a start time type and a delay value, wherein the start time type comprises immediate, delayed, or scheduled, wherein a start moment of the specified time interval comprises a moment at which the first network device starts processing the route control message when the start time type comprises immediate, wherein the start moment of the specified time interval comprises the start time value plus the delay value when the start time type comprises delayed, and wherein the start moment of the specified time interval comprises the start time value when the start time type comprises scheduled.

3. The method according to claim 1, wherein the flow effective time parameter further comprises a duration type comprising keeping effective, absolutely becoming invalid, or becoming invalid during idle time, wherein the duration value comprises an invalid value when the duration type comprises keeping effective, wherein an end moment of the specified time interval comprises a start moment of the specified time interval plus the duration value when the duration type comprises absolutely becoming invalid, and wherein the end moment of the specified time interval comprises a moment when time at which the first network device does not process the service traffic corresponding to the route related to the flow effective time parameter reaches the duration value and when the duration type comprises becoming invalid during idle time.

4. The method according to claim 1, wherein the flow effective time parameter further comprises a duration type and a period value, wherein the duration type comprises absolutely becoming invalid, wherein the period value indicates that the route related to the flow effective time parameter periodically becomes effective and a length of a period, wherein the period value is greater than or equal to the duration value, wherein a start moment of periodically becoming effective comprises the start time value or a moment at which the first network device starts processing the route control message, wherein each period interval of periodically becoming effective comprises the specified time interval, wherein a start moment of the specified time interval comprises a start moment of each period interval of periodically becoming effective, and wherein duration of the specified time interval comprises the duration value.

5. The method according to claim 1, wherein the extended BGP update message comprises a flow extension attribute, wherein the flow extension attribute comprises a flow effective time field, wherein the flow effective time field carries the flow effective time parameter, wherein the flow effective time field comprises a flow effective time type field, a first length field, a start time value field, and a duration value field, wherein the flow effective time type field indicates a type of the flow effective time field, wherein the first length field indicates a length of the flow effective time field, wherein the start time value field carries the start time value, and wherein the duration value field carries the duration value.

6. The method according to claim 5, wherein the flow effective time field further comprises a start time type field, a duration type field, and a delay value field, wherein the start time type field indicates immediate, delayed, or scheduled, wherein the duration type field indicates keeping effective, absolutely becoming invalid, or becoming invalid during idle time, and wherein the delay value field carries a delay value.

7. The method according to claim 5, wherein the flow effective time field further comprises a period value field, and wherein the period value field carries a period value.

8. The method according to claim 5, wherein the flow extension attribute further comprises a flow identifier (ID) field, wherein the flow ID field comprises a flow ID type field, a second length field, an autonomous system (AS) ID field, a router ID field, and a flow ID value field, wherein the flow ID type field indicates a type of the flow ID field, wherein the second length field indicates a length of the flow ID field, wherein the AS ID field indicates an AS in which the first network device is located, wherein the router ID field identifies the first network device, and wherein the flow ID value field carries a flow ID.

9. The method according to claim 5, wherein the flow extension attribute further comprises a flow description field, wherein the flow description field comprises a flow description type field, a third length field, and a flow description value field, wherein the flow description type field indicates a type of the flow description field, wherein the third length field indicates a length of the flow description field, and wherein the flow description value field carries a flow description.

10. The method according to claim 5, wherein the flow extension attribute further comprises a flag field of canceling an invalid route.

11. A route processing method, comprising:
receiving, by a second network device, a route control message from a first network device, wherein the route control message carries a flow effective time parameter and a route related to the flow effective time parameter, wherein the flow effective time parameter comprises a start time value and a duration value, and wherein the flow effective time parameter indicates that the route related to the flow effective time parameter is effective in a time interval specified by the flow effective time parameter;
processing, by the second network device in the specified time interval, service traffic corresponding to the route related to the flow effective time parameter; and sending, by the second network device, the route control message to other network devices, wherein the other network devices do not comprise the first network device, wherein the route control message comprises an extended border gateway protocol (BGP) update message, wherein the extended BGP update message comprises network layer reachability information (NLRI), wherein the NLRI carries the route related to the flow effective time parameter, and wherein the flow effective time parameter indicates that the route related to the flow effective time parameter is effective in the specified time interval.

12. The method according to claim 11, wherein the flow effective time parameter further comprises a start time type and a delay value, wherein the start time type comprises immediate, delayed, or scheduled, wherein a start moment of the specified time interval comprises a moment at which the second network device starts processing the route control message when the start time type comprises immediate, wherein the start moment of the specified time interval comprises the start time value plus the delay value when the start time type comprises delayed, and wherein the start moment of the specified time interval comprises the start time value when the start time type comprises scheduled.

13. The method according to claim 11, wherein the flow effective time parameter further comprises a duration type, wherein the duration type comprises keeping effective, absolutely becoming invalid, or becoming invalid during idle time, wherein the duration value comprises an invalid value when the duration type comprises keeping effective, wherein an end moment of the specified time interval comprises a start moment of the specified time interval plus the duration value when the duration type comprises absolutely becoming invalid, and wherein the end moment of the specified time interval comprises a moment when time at which the second network device does not process the service traffic corresponding to the route related to the flow effective time parameter reaches the duration value and when the duration type comprises becoming invalid during idle time.

14. The method according to claim 11, wherein the flow effective time parameter further comprises a duration type and a period value, wherein the duration type comprises absolutely becoming invalid, wherein the period value indicates that the route related to the flow effective time parameter periodically becomes effective and a length of a period, wherein the period value is greater than or equal to the duration value, wherein a start moment of periodically becoming effective comprises the start time value or a moment at which the second network device starts processing the route control message, wherein each period interval of periodically becoming effective comprises the specified time interval, wherein a start moment of the specified time interval comprises a start moment of each period interval of periodically becoming effective, and wherein duration of the specified time interval comprises the duration value.

15. The method according to claim 11, further comprising modifying, by the second network device, the flow effective time parameter.

16. A first network device, comprising:
a non-transitory memory storing instructions; and
a processor coupled to the non-transitory memory, wherein the instructions cause the processor to be configured to:
obtain a flow effective time parameter and a route related to the flow effective time parameter, wherein the flow effective time parameter comprises a start time value and a duration value, and wherein the flow effective time parameter indicates that the route related to the flow effective time parameter is effective in a time interval specified by the flow effective time parameter;

process, in the specified time interval, service traffic corresponding to the route related to the flow effective time parameter;

generate a route control message, wherein the route control message carries the flow effective time parameter and the route related to the flow effective time parameter; and send the route control message to a second network device, wherein the route control message comprises an extended border gateway protocol (BGP) update message, wherein the extended BGP update message comprises network layer reachability information (NLRI), wherein the NLRI carries the route related to the flow effective time parameter, and wherein the flow effective time parameter indicates that the route related to the flow effective time parameter is effective in the specified time interval.

17. The first network device according to claim 16, wherein the flow effective time parameter further comprises a start time type and a delay value, wherein the start time type comprises immediate, delayed, or scheduled, wherein a start moment of the specified time interval comprises a moment at which the processor starts processing the route control message when the start time type comprises immediate, wherein the start moment of the specified time interval comprises the start time value plus the delay value when the start time type comprises delayed, and wherein the start moment of the specified time interval comprises the start time value when the start time type comprises scheduled.

18. The first network device according to claim 16, wherein the flow effective time parameter further comprises a duration type, wherein the duration type comprises keeping effective, absolutely becoming invalid, or becoming invalid during idle time, wherein the duration value comprises an invalid value when the duration type comprises keeping effective, wherein an end moment of the specified time interval comprises a start moment of the specified time interval plus the duration value when the duration type comprises absolutely becoming invalid, and wherein the end moment of the specified time interval comprises a moment when time at which the processor does not process the service traffic corresponding to the route related to the flow effective time parameter reaches the duration value and when the duration type comprises becoming invalid during idle time.

19. The first network device according to claim 16, wherein the flow effective time parameter further comprises a duration type and a period value, wherein the duration type comprises absolutely becoming invalid, wherein the period value indicates that the route related to the flow effective time parameter periodically becomes effective and a length of a period, wherein the period value is greater than or equal to the duration value, wherein a start moment of periodically becoming effective comprises the start time value or a moment at which the processor starts processing the route control message, wherein each period interval of periodically becoming effective comprises the specified time interval, wherein a start moment of the specified time interval comprises a start moment of each period interval of periodically becoming effective, and wherein duration of the specified time interval is the duration value.

20. The first network device according to claim 16, wherein the extended BGP update message comprises a flow extension attribute, wherein the flow extension attribute comprises a flow effective time field, wherein the flow effective time field carries the flow effective time parameter, wherein the flow effective time field comprises a flow effective time type field, a first length field, a start time value field, and a duration value field, wherein the flow effective time type field indicates a type of the flow effective time field, wherein the first length field indicates a length of the flow effective time field, wherein the start time value field carries the start time value, and wherein the duration value field carries the duration value.

21. The first network device according to claim 20, wherein the flow effective time field further comprises a start time type field, a duration type field, and a delay value field, wherein the start time type field indicates immediate, delayed, or scheduled, wherein the duration type field indicates keeping effective, absolutely becoming invalid, or becoming invalid during idle time, and wherein the delay value field carries a delay value.

22. The first network device according to claim 20, wherein the flow effective time field further comprises a period value field, and wherein the period value field carries a period value.

23. The first network device according to claim 20, wherein the flow extension attribute further comprises a flow identifier (ID) field, wherein the flow ID field comprises a flow ID type field, a second length field, an autonomous system (AS) ID field, a router ID field, and a flow ID value field, wherein the flow ID type field indicates a type of the flow ID field, wherein the second length field indicates a length of the flow ID field, wherein the AS ID field indicates an AS in which the first network device is located, wherein the router ID field identifies the first network device, and wherein the flow ID value field carries a flow ID.

24. A second network device, comprising:
a non-transitory memory storing instructions; and
a processor coupled to the non-transitory memory, wherein the instructions cause the processor to be configured to:
receive a route control message from a first network device, wherein the route control message carries a flow effective time parameter and a route related to the flow effective time parameter, wherein the flow effective time parameter comprises a start time value and a duration value, and wherein the flow effective time parameter indicates that the route related to the flow effective time parameter is effective in a time interval specified by the flow effective time parameter;
process, in the specified time interval, service traffic corresponding to the route related to the flow effective time parameter; and
send the route control message to other network devices, wherein the other network devices do not comprise the first network device,
wherein the route control message comprises an extended border gateway protocol (BGP) update message, wherein the extended BGP update message comprises network layer reachability information (NLRI), wherein the NLRI carries the route related to the flow effective time parameter, and wherein the flow effective time parameter indicates that the route related to the flow effective time parameter is effective in the specified time interval.

25. The second network device according to claim 24, wherein the flow effective time parameter further comprises a start time type and a delay value, wherein the start time type comprises immediate, delayed, or scheduled, wherein a start moment of the specified time interval comprises a moment at which the processor starts processing the route control message when the start time type comprises immediate, wherein the start moment of the specified time interval comprises the start time value plus the delay value when the start time type comprises delayed, and wherein the start moment of the specified time interval comprises the start time value when the start time type comprises scheduled.

26. The second network device according to claim 24, wherein the flow effective time parameter further comprises a duration type, wherein the duration type comprises keeping effective, absolutely becoming invalid, or becoming invalid during idle time, wherein the duration value comprises an invalid value when the duration type comprises keeping effective, wherein an end moment of the specified time interval comprises a start moment of the specified time interval plus the duration value when the duration type comprises absolutely becoming invalid, and wherein the end moment of the specified time interval comprises a moment when time at which the processor does not process the service traffic corresponding to the route related to the flow effective time parameter reaches the duration value when the duration type comprises becoming invalid during idle time.

27. The second network device according to claim 24, wherein the flow effective time parameter further comprises a duration type and a period value, wherein the duration type comprises absolutely becoming invalid, wherein the period value indicates that the route related to the flow effective time parameter periodically becomes effective and a length of a period, wherein the period value is greater than or equal to the duration value, wherein a start moment of periodically becoming effective comprises the start time value or a moment at which the processor starts processing the route control message, wherein each period interval of periodically becoming effective comprises the specified time interval, wherein a start moment of the specified time interval comprises a start moment of each period interval of periodically becoming effective, and wherein duration of the specified time interval comprises the duration value.

28. The second network device according to claim 24, wherein the instructions further cause the processor to be configured to modify the flow effective time parameter.

* * * * *